(12) United States Patent
Takeda et al.

(10) Patent No.: US 9,602,252 B2
(45) Date of Patent: Mar. 21, 2017

(54) WIRELESS COMMUNICATIONS TERMINAL, BASE STATION DEVICE, AND RESOURCE ALLOCATION METHOD

(71) Applicant: Sun Patent Trust, New York, NY (US)

(72) Inventors: Kazuki Takeda, Kanagawa (JP); Toru Oizumi, Osaka (JP); Ayako Horiuchi, Kanagawa (JP); Akihiko Nishio, Osaka (JP)

(73) Assignee: Sun Patent Trust, New York, NY (US)

( * ) Notice: Subject to any disclaimer, the term of this patent is extended or adjusted under 35 U.S.C. 154(b) by 222 days.

(21) Appl. No.: 14/233,373

(22) PCT Filed: May 7, 2013

(86) PCT No.: PCT/JP2013/002930
§ 371 (c)(1),
(2) Date: Jan. 16, 2014

(87) PCT Pub. No.: WO2013/168405
PCT Pub. Date: Nov. 14, 2013

(65) Prior Publication Data
US 2014/0164864 A1  Jun. 12, 2014

(30) Foreign Application Priority Data

May 10, 2012 (JP) .................................. 2012-108447

(51) Int. Cl.
*H04L 1/18* (2006.01)
*H04W 72/04* (2009.01)
*H04L 1/00* (2006.01)

(52) U.S. Cl.
CPC .......... *H04L 1/1854* (2013.01); *H04L 1/0038* (2013.01); *H04L 1/1864* (2013.01); *H04W 72/042* (2013.01)

(58) Field of Classification Search
CPC  H04W 72/042; H04W 28/044; H04L 1/1854; H04L 1/1671; H04L 5/0055;
(Continued)

(56) References Cited
U.S. PATENT DOCUMENTS 8,649,346 B2 *  2/2014  Park ...................... H04L 1/1692
370/329
2010/0177717 A1 *  7/2010  Sung ................... H04W 72/042
370/329

(Continued)

OTHER PUBLICATIONS

3GPP TS 36.211 V10.4.0, "3rd Generation Partnership Project; Technical Specification Group Radio Access Network; Evolved Universal Terrestrial Radio Access (E-UTRA); Physical Channels and Modulation (Release 10)," Dec. 2011, 101 pages.

(Continued)

*Primary Examiner* — David Ton
(74) *Attorney, Agent, or Firm* — Seed IP Law Group LLP

(57) ABSTRACT

The purpose of the present invention is to avoid ACK/NACK collision in a system in which E-PDCCH control information is transmitted, increase the utilization efficiency of ACK/NACK resources, and suppress unnecessary PUSCH band reduction. A wireless communications terminal having a configuration comprising: a reception unit that receives control signals including ACK/NACK indexes, via an expanded physical downlink control channel; a control unit that determines, on the basis of the ACK/NACK indexes, whether to use a dynamically allocated dynamic ACK/NACK resource or a specified resource specified beforehand, to send downlink data ACK/NACK signals; and a transmission unit that sends the ACK/NACK signals using the dynamic ACK/NACK resource or the specified resource, as determined.

12 Claims, 17 Drawing Sheets

(58) Field of Classification Search
CPC ... H04L 1/1829; H04L 1/1861; H04L 1/0055; H04L 1/0026

See application file for complete search history.

(56) References Cited

U.S. PATENT DOCUMENTS

| | | | |
|---|---|---|---|
| 2011/0211546 A1* | 9/2011 | Hooli | H04W 28/06 370/329 |
| 2013/0016686 A1* | 1/2013 | Li | H04L 1/1822 370/329 |
| 2013/0136093 A1* | 5/2013 | Han | H04B 7/0689 370/329 |
| 2013/0343314 A1* | 12/2013 | Tiirola | H04L 5/0016 370/329 |
| 2014/0036856 A1* | 2/2014 | Park | H04L 1/1671 370/329 |
| 2014/0119249 A1* | 5/2014 | Park | H04L 1/1692 370/280 |
| 2014/0314031 A1* | 10/2014 | Kim | H04L 1/1861 370/329 |

OTHER PUBLICATIONS

3GPP TS 36.212 V10.4.0, "3rd Generation Partnership Project; Technical Specification Group Radio Access Network; Evolved Universal Terrestrial Radio Access (E-UTRA); Multiplexing and channel coding (Release 10)," Dec. 2011, 79 pages.

3GPP TS 36.213 V10.4.0, "3rd Generation Partnership Project; Technical Specification Group Radio Access Network; Evolved Universal Terrestrial Radio Access (E-UTRA); Physical layer procedures (Release 10)," Dec. 2011, 125 pages.

Alcatel-Lucent Shanghai Bell, Alcatel-Lucent, "DCI Multiplexing for ePDCCH," R1-121253, Agenda Item: 7.6.3, 3GPP TSG RAN WG1 Meeting #68bis, Jeju, Korea, Mar. 26-30, 2012, 3 pages.

Catt, "PUCCH resource for E-PDCCH," R1-120113, Agenda Item: 7.6.5, 3GPP TSG RAN WG1 Meeting #68, Dresden, Germany, Feb. 6-10, 2012, 1 page.

Panasonic, "PUCCH enhancement for UL CoMP," R1-121158, Agenda Item: 7.5.6.3 Uplink control signaling, 3GPP TSG-RAN WG1 Meeting #68bis, Jeju, Korea, Mar. 26-30, 2012, 4 pages.

Sharp, "PUCCH resource managment for CoMP Scenarios," R1-121352, Agenda Item: 7.5.6.3, 3GPP TSG RAN WG1 Meeting #68bis, Jeju, Korea, Mar. 26-30, 2012, 15 pages.

International Search Report, dated Jul. 23, 2013, for corresponding International Application No. PCT/JP2013/002930, 3 pages.

Nokia Siemens Networks, Nokia, "HARQ-ACK resource allocation for data scheduled via ePDCCH," R1-121290, 3GPP TSG-RAN WG1 Meeting #68bis, Agenda Item: 7.6.4, Jeju, Korea, Mar. 26-30, 2012, 2 pages.

Samsung, "HARQ-ACK PUCCH Resources in Response to E-PDCCH Detections," R1-121647, 3GPP TSG RAN WG1 #68bis, Agenda Item: 7.6.4, Jeju, Korea, Mar. 26-30, 2012, 2 pages.

Samsung, "HARQ-ACK Transmission in Response to E-PDCCH Detection," R1-120193, 3GPP TSG RAN WG1 #68, Agenda Item: 7.6.5, Dresden, Germany, Feb. 6-10, 2012, 3 pages.

Extended European Search Report dated Apr. 8, 2015, for corresponding EP Application No. 13787854.2-1851 / 2849515, 6 pages.

Extended European Search Report dated May 12, 2015, for corresponding EP Application No. 13787854.2-1851 / 2849515, 6 pages.

* cited by examiner

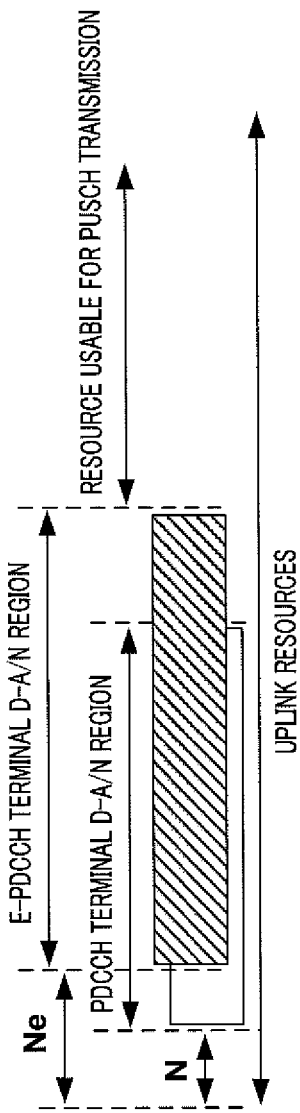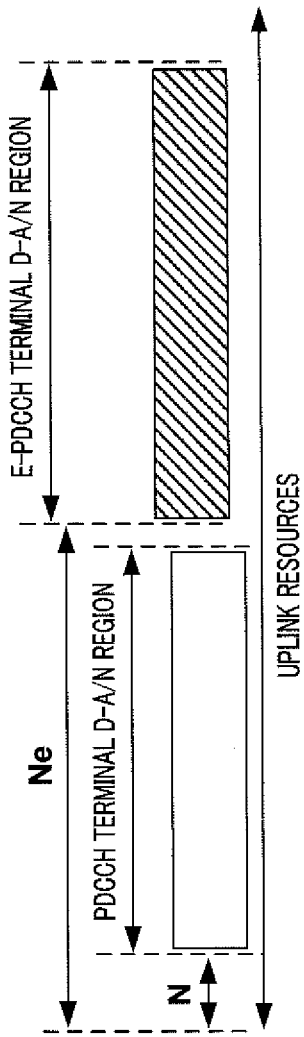
FIG. 6A
FIG. 6B

WIRELESS COMMUNICATIONS TERMINAL, BASE STATION DEVICE, AND RESOURCE ALLOCATION METHOD

TECHNICAL FIELD

The present invention relates to a radio communication terminal, a base station apparatus, and an ACK/NACK signal resource allocation method.

BACKGROUND ART

The 3GPP (3rd Generation Partnership Project Radio Access Network) has established LTE (Long Term Evolution) Rel. 8 (Release 8) and the extended version of LTE, which is LTE Rel. 10 (LTE-Advanced). In these standards, a base station, and a radio communication terminal (also called "UE (User Equipment)" and referred to below as a terminal) transmit control information for transmitting and receiving data using a downlink PDCCH (physical downlink control channel) (refer to Non-Patent Literature 1 to 3). FIG. 1 shows the subframe configuration of the downlink. In the subframes, the PDCCH that transmits a control signal and the PDSCH (physical downlink shared channel) that transmits a data signal are time-division multiplexed. The terminal first decodes the control information transmitted to the terminal through the PDCCH and obtains information regarding a frequency allocation required for data reception on the downlink, and adaptive control, for example. The terminal then decodes data for the terminal that is included in the PDSCH, based on the control information. If control information that grants data transmission on the uplink is included in the PDCCH, the terminal transmits data on the PUSCH (physical uplink shared channel) of the uplink, based on the control information.

In order to transmit and receive data on the downlink, an HARQ (hybrid automatic request) combining error correction decoding and an automatic retransmission request has been introduced. After performing error correction decoding, the terminal judges whether or not the data is correctly decoded, based on a CRC (cyclic redundancy checksum) appended to the data. If the decoding is successful, the terminal feeds back an ACK to the base station. If, however, the decoding fails, the terminal feeds back a NACK to the base station, prompting retransmission of the data in which an error is detected. The feedback of ACK/NACK (acknowledge response; hereinafter referred to as "A/N") is transmitted on the uplink. If data is not assigned to the PUSCH at the time of transmission, transmission is performed on the PUCCH (physical uplink control channel). If, however, data is assigned to the PUSCH at the time of A/N transmission, A/N is transmitted on either the PUCCH or the PUSCH. When this is done, the base station instructs the terminal beforehand as to whether transmission is to be done on the PUCCH or the PUSCH. FIG. 2 shows the uplink subframe configuration that includes the PUSCH and the PUCCH.

If A/N is transmitted on the PUCCH, there are situations to be handled differently. For example, if the A/N transmission overlaps with the feedback of CSI (channel state information) periodically transmitted on the uplink, the PUCCH formats 2a/2b are used. On the downlink, if carrier aggregation, in which transmission is performed using a plurality of carriers that are bundled together, is set to ON, and also the number of carriers is at least three, the PUCCH format 3 is used. However, regardless of whether carrier aggregation is OFF or ON, if the number of carriers is two or fewer and there is no control information other than A/N and other than an uplink scheduling request, even if the number of carriers does not exceed two, the PUCCH formats 1a/1b are used. In considering that downlink data is transmitted more frequently than uplink data, and also considering that the period of CSI feedback is not more frequent than the period of downlink data assignment, A/N is most often transmitted by the PUCCH formats 1a/1b. The following description will focus on the PUCCH formats 1a/1b.

FIG. 3 shows the slot configuration of the PUCCH formats 1a/1b. The A/N signals transmitted by a plurality of terminals are distributed by the Walsh sequence having a length-4 sequence and a DFT (discrete Fourier transform) sequence having a length-3 sequence and are code multiplexed and received at the base station. In FIG. 3, ($W_0$, $W_1$, $W_2$, $W_3$) and ($F_0$, $F_1$, $F_2$) represent, respectively, the above-noted Walsh sequence and DFT sequence. At the terminal, a signal representing either ACK or NACK first undergoes primary spreading to frequency components corresponding to 1SC-FDMA symbols by a ZAC (zero auto-correlation) sequence (with a subcarrier having a length-12 sequence) in the frequency domain. That is, a ZAC series having a series length of 12 is multiplied by an A/N signal component represented by a complex number. Then, the A/N signal after primary spreading and the ZAC series as a reference signal undergo secondary spreading by a Walsh sequence ($W_0$ to $W_3$ of a length-4 sequence, also called a Walsh code sequence) and a DFT sequence ($F_0$ to $F_2$ of a length-3 sequence). That is, each component of a signal having a length-12 sequence (an A/N signal after primary spreading or a ZAC sequence (reference signal sequence)) is multiplied by each component of an orthogonal sequence (for example, a Walsh sequence or a DFT sequence). Additionally, the signal after secondary spreading is converted by an IFFT (inverse fast Fourier transform) to a length-12 sequence (subcarrier) signal in the time domain. Then, a CP (cyclic prefix) is added to each signal after the IFFT, thereby forming a one-slot signal made up of seven SC-FDMA symbols.

A/N signals from different terminals having different cyclic shift indexes are spread using ZAC sequences corresponding to different cyclic shift indexes and an orthogonal code sequences corresponding to different orthogonal cover indexes (OC indexes). The orthogonal code sequence is a set of a Walsh sequence and a DFT sequence. The orthogonal code sequence is also called a block-wise spreading code sequence. Therefore, by using the conventional despreading and correlation processing, the base station can demultiplex the plurality of A/N signals that have been code multiplexed and cyclic shift multiplexed. Because there is a limit to the number of A/N signals that can be code multiplexed and cyclic shift multiplexed per frequency resource block (RB), if the number of terminals becomes large, frequency multiplexing is performed using different RBs. In the following, the code-RB resource in which A/N is transmitted will be called the A/N resource. The A/N resource number is determined by the number of the RB in which A/N is transmitted and the code number and cyclic shift value in the RB. Because multiplexing by cyclic shifting of the ZAC sequence can be treated as a type of code multiplexing, there will be cases in which orthogonal code and cyclic shift will be collectively called code in the following description.

In LTE, in order to reduce interference from other cells on the PUCCH, the ZAC sequence to be used is determined based on the cell ID. Because the mutual correlation between different ZAC sequences is small, by using different ZAC sequences between different cells, the interference can be reduced. Also, in the same manner, sequence hopping and cyclic shift hopping based on the cell ID has been introduced. With this hopping, shifting is done cyclically in units of SC-FDMA symbols, using a cyclic shift hopping pattern, while mutual correlation on the cyclic shift axis and orthogonal code axis are maintained. Doing this enables randomization of combinations of A/N signals that are strongly interfered by other cells, while the mutual orthogonal relationship between A/N signals are maintained within a cell, and also enables removal of continuous strong interference to only some of the terminals from other cells.

In the description to follow, the description will be of the case in which a ZAC sequence is used for primary spreading, and a block-wise spreading code sequence is used for secondary spreading. However, for the primary spreading, rather than using a ZAC sequence, sequences that are mutually separable by mutually different cyclic shift values may be used. For example, a GCL (general chirp-like) sequence, a CAZAC (constant amplitude zero auto correlation) sequence, a ZC (Zadoff-Chu) sequence, a PN sequence such as an M sequence or an orthogonal Gold code sequence, or a computer-generated random sequence having sharp autocorrection characteristics may be used for the primary spreading. As long as the sequence can be treated as being mutually orthogonal or substantially mutually orthogonal, any sequence can be used as a block-wise spreading code sequence for the secondary spreading. For example, a Walsh sequence or a Fourier sequence or the like can be used as a block-wise spreading code sequence for the secondary spreading.

In LIE, as a method of allocating different A/N resources to different terminals, allocation is used that is based on control information mapping results of the PDCCH. That is, using the fact that PDCCH control information is not mapped onto the same resources between a plurality of terminals, a one-to-one correspondence is established between the PDCCH resources and the PUCCH formats 1a/1b A/N resources (hereinafter described simply as A/N resources). This will be described below.

The PDCCH is made up of one or more L1/L2 CCHs (L1/L2 control channels). Each L1/L2 CCH is made up of one or more CCEs (control channel elements). That is, a CCE is the basic unit of mapping control information onto a PDCCH. Also, when one L1/L2 CCH is made up of a plurality (2, 4, or 8) of CCEs, a plurality of continuous CCEs with a CCE having an even-numbered index as the origin is allocated to that L1/L2 CCH. The base station, in accordance with the number of CCEs necessary for notification of control information to the subject terminal to which resources are to be allocated, allocates an L1/L2 CCH to the terminal to which the resources are to be allocated. The base station then maps the control information onto the physical resources corresponding to the CCE of that L1/L2 CCH. In this case, there is a one-to-one correspondence between each CCE and A/N resource. Therefore, a terminal that has received an L1/L2 CCH identifies the A/N resources corresponding to the CCEs making up that L1/L2CCH, and uses those resources (that is, codes and frequencies) to transmit the A/N signal to the base station. However, in the case of the L1/L2CCH occupying a plurality of continuous CCEs, the terminal uses an A/N resource corresponding to the CCE having the smallest index of a plurality of PUCCH constituent resources corresponding to a plurality of CCE (that is, the A/N resource that has been associated with the CCE having a CCE index that is even number) to transmit the A/N signal to the base station. Specifically, the A/N resource number $n_{PUCCH}$ is established by the following equation (Non-Patent Literature 3).

[1]
$$n_{PUCCH} = N + n_{CCE} \quad \text{(Equation 1)}$$

In this case, the above-noted A/N resource number $n_{PUCCH}$ is the above-described A/N resource number, N is the A/N resource offset value given in common within the cell, and $n_{CCE}$ is the number of the CCE onto which the PDCCH is mapped. According to Equation 1, it can be seen that, in accordance with the range that can be taken by $n_{CEE}$, an A/N resource within a certain range can be used. In the following, the A/N that determines the resources dependent upon the control information scheduling of the PDCCH in this manner will be noted as D-A/N (dynamic A/N (dynamic ACK/NACK)).

As described above, the A/N resources include frequency resources in addition to code resources. Because the PUCCH and the PUSCH use the same frequency band in the uplink, there is a tradeoff between the region of the PUCCH that includes the D-A/N and the bandwidth of the PUSCH.

CITATION LIST

Non-Patent Literature

NPL 1
3GPP TS 36.211 V10.4.0, "Physical Channels and Modulation (Release 10)," December 2011
NPL 2
3GPP TS 36.212 V10.4.0, "Multiplexing and Channel Coding (Release 10)," December 2011
NPL 3
3GPP TS 36.213 V10.4.0, "Physical layer procedures (Release 10)," December 2011.
NPL 4
3GPP RAN1#68bis, R1-121352, "PUCCH resource management for CoMP scenarios," Sharp, March 2012.
NPL 5
3GPP RAN1#68bis, R1-121158, "PUCCH enhancement for UL CoMP," Panasonic, March 2012.

SUMMARY OF INVENTION

Technical Problems

Because the PDCCH has a limited region for the assignment of control information, the number of terminals and amount of control information that can be assigned simultaneously is limited. Also, the PDCCH is supposed to be received in accordance with cell-specific parameters. Because the PDCCH is dependent on the cell-specific parameters, there is a problem in that the PDCCH is not suitable for CoMP (coordinated multipoint) operation in which there is coordination between a plurality of cells or an HetNet (heterogeneous network) in which pico base stations are disposed and operated within a cell formed by a macro base station. In this respect, the adoption of an E-PDCCH (enhanced PDCCH (enhanced downlink control channel)) as a new control channel different from the PDCCH, is under discussion in Rel.11.

Adoption of the E-PDCCH enables an increase in the control information region. Additionally, the E-PDCCH has the advantage of enabling flexible control information allocation that is not restricted by the settings in units of cells. For this reason, adoption of the E-PDCCH is expected to enable operation suitable in particular for CoMP, in which coordination is made between cells, and for HetNet, in which inter-cell interference control is important.

When the E-PDCCH is adopted, however, unless some measure is taken, it is expected that collision can occur in the uplink A/N between a terminal controlled by the E-PDCCH control information and a terminal controlled by the PDCCH control information. Alternatively, a problem can be expected in which the PUSCH band is reduced, if excessive A/N resources are reserved wastefully to prevent collision.

An object of the present invention is to provide a radio communication terminal, a base station apparatus, and a resource allocation method that, while preventing A/N collision, increase the A/N resource utilization efficiency and that cause no unnecessary reduction of the PUSCH band in a system that transmits E-PDCCH control information.

Solution to Problem

A radio communication terminal according to an aspect of the present invention includes: a receiving section that receives, via an enhanced physical downlink control channel, a control signal including an ACK/NACK indicator; a control section that determines, based on the ACK/NACK indicator, whether to transmit an ACK/NACK signal for downlink data using a dynamic ACK/NACK resource dynamically allocated or using a specific resource specified beforehand; and a transmitting section that transmits the ACK/NACK signal using the determined dynamic ACK/NACK resource or specific resource.

A radio communication terminal according to an aspect of the present invention includes: a receiving section that receives, via an enhanced physical downlink control channel, a control signal including an ACK/NACK indicator; a control section that selects, based on the ACK/NACK indicator, one of a plurality of dynamic ACK/NACK regions separated from each other in the frequency domain, and that determines, from among a plurality of resources included in the selected dynamic ACK/NACK region, a dynamic ACK/NACK resource used for transmitting an ACK/NACK signal for downlink data, in accordance with the control signal; and a transmitting section that transmits the ACK/NACK signal using the determined dynamic ACK/NACK resource in the selected dynamic ACK/NACK resource region.

A base station apparatus according to an aspect of the present invention includes: a control section that determines to which of a plurality of dynamic ACK/NACK regions separated from each other in the frequency domain, a resource used for transmitting an ACK/NACK signal for downlink data from a radio communication terminal is to be allocated; and a transmitting section that transmits a control signal including an ACK/NACK indicator representing the results of determination made by the control section, using a control channel element associated with the resource used for transmitting the ACK/NACK signal on an enhanced physical downlink control channel.

A base station apparatus according to an aspect of the present invention includes: a control section that select one of a plurality of dynamic ACK/NACK regions separated from each other in the frequency domain, as a dynamic ACK/NACK region to which a resource used for transmitting an ACK/NACK signal for downlink data from a radio communication terminal is to be allocated, and determines a resource used for transmitting the ACK/NACK signal from among a plurality of dynamic ACK/NACK resources included in the selected dynamic ACK/NACK region; and a transmitting section that transmits a control signal including an ACK/NACK indicator representing the results of determination made by the control section, using a control channel element associated with the resource used for transmitting the ACK/NACK signal on an enhanced physical downlink control channel.

A resource allocation method according to an aspect of the present invention includes: receiving a control signal including an ACK/NACK indicator via an enhanced physical downlink control channel; and determining, based on the ACK/NACK indicator, whether an ACK/NACK signal for downlink data is to be transmitted using a dynamic ACK/NACK resource dynamically allocated or is to be transmitted using a specific resource specified beforehand.

A resource allocation method according to an aspect of the present invention includes: receiving a control signal including an ACK/NACK indicator via an enhanced physical downlink control channel; and selecting, based on the ACK/NACK indicator, one of a plurality of dynamic ACK/NACK regions separated from each other in the frequency domain, and determining from among a plurality of resources included in the selected dynamic ACK/NACK region, a dynamic ACK/NACK resource used for transmitting an ACK/NACK signal for downlink data, in accordance with the control signal.

Advantageous Effects of Invention

According to the present invention, in the case where control information is transmitted on the enhanced physical downlink control channel and the physical downlink control channel, it is possible to increase the A/N resource utilization efficiency and to avoid an unnecessary reduction of the PUSCH band while avoiding collision between A/N signals for downlink data.

BRIEF DESCRIPTION OF DRAWINGS

FIGS. 6A and 6B are drawings showing examples in which the D-A/N region for a PDCCH terminal and the D-A/N region for an E-PDCCH terminal are set;

DESCRIPTION OF EMBODIMENTS

Embodiments of the present invention will be described in detail below, with references made to the drawings.

Embodiment 1

Background of Obtaining an Embodiment of the Present Invention

First, before describing the specific configuration and operation of Embodiment 1, one method that the inventors of the present invention have noticed as a method for allocating A/N resources in the case of adopting the E-PDCCH will be described.

Figure 1:
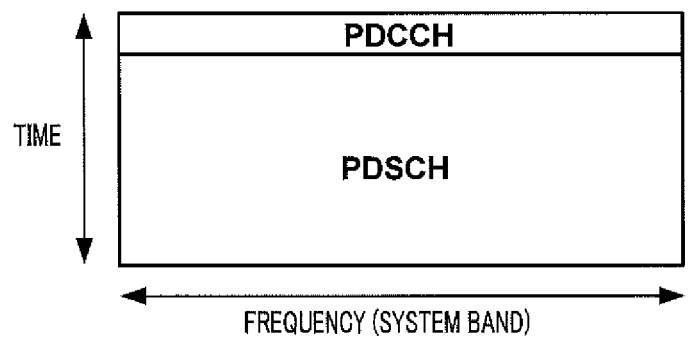
FIG. 1 is a drawing showing the subframe configuration of the downlink.
Figure 2:
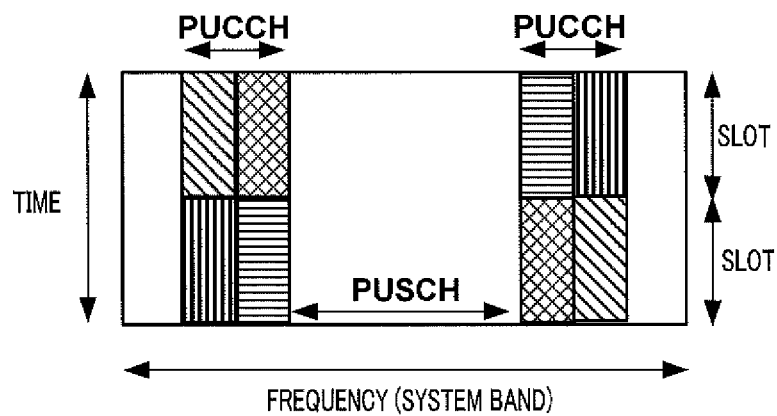
FIG. 2 is a drawing showing the subframe configuration of the uplink.
Figure 3:
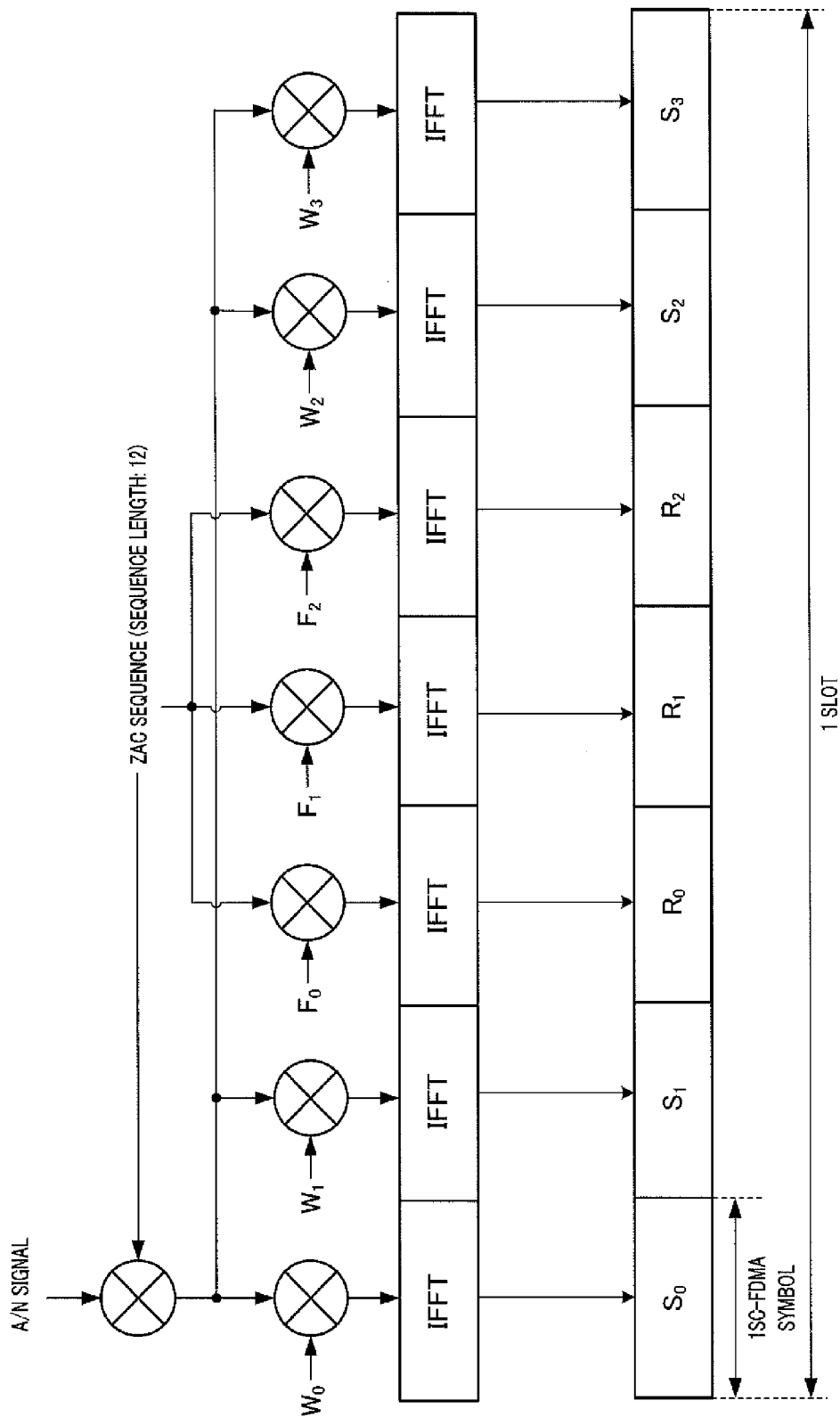
FIG. 3 is a drawing describing the method of spreading of the A/N signal in the PUCCH formats 1a/1b.
Figure 4:
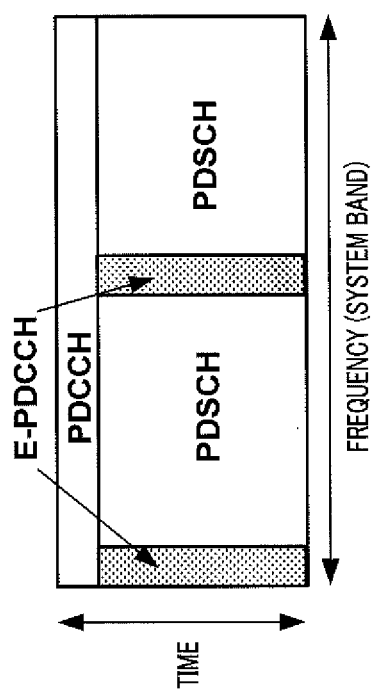
FIG. 4 is a drawing showing an example of the subframe configuration of the downlink at the time of E-PDCCH transmission.
Figure 5:
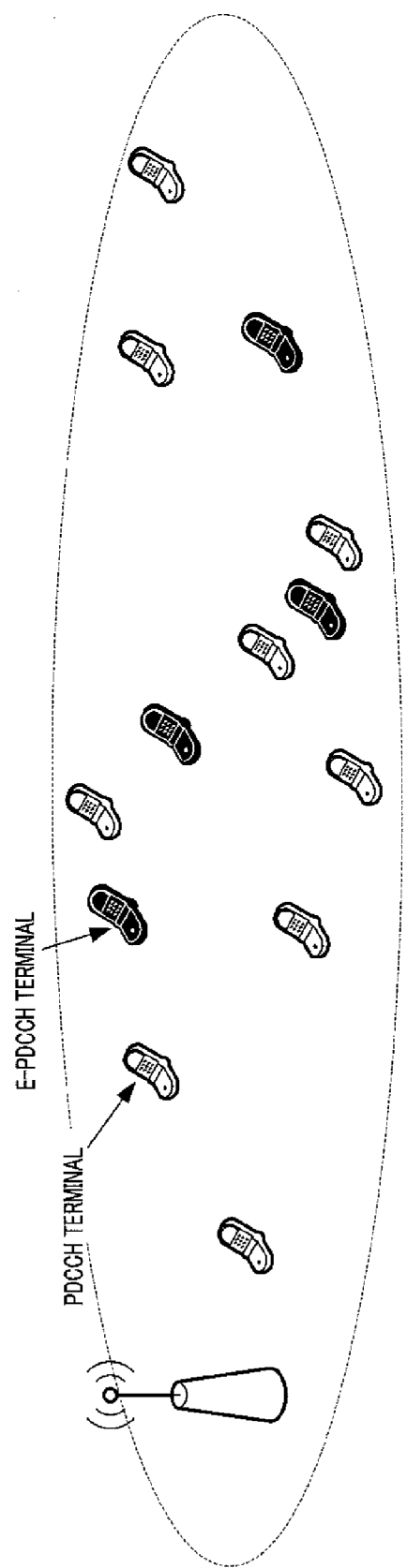
FIG. 5 is a drawing showing the system configuration when E-PDCCH is adopted.

FIG. 4 shows an example of the downlink subframe at the time of E-PDCCH transmission. FIG. 5 shows the system configuration when E-PDCCH is adopted.

As shown in FIG. 5, in a communication system adopting the E-PDCCH, it is expected that PDCCH terminals and E-PDCCH terminals are mixed within one cell (the E-PDCCH terminals in FIG. 5 being shown in black). In this case, a PDCCH terminal is a terminal that receives PDCCH control information for controlling its communication, and an E-PDCCH terminal is a terminal that receives E-PDCCH control information for controlling its communication.

The E-PDCCH has the following features.

(1) Unlike the PDCCH, which is transmitted using resources common to all terminals, the E-PDCCH is transmitted using frequency resource blocks that are assigned to each terminal individually.

(2) Unlike the PDCCH, which is demodulated using a reference signal that is common to all terminals within a cell, the EPDCCH is demodulated using a cell-specific reference signal given for each terminal individually.

(3) Unlike the PDCCH, which is scrambled using a scramble code that is common to all terminals with a cell, the EPDCCH is scrambled using a scramble code given for each terminal individually.

(4) Whether or not to transmit the E-PDCCH can be changed by a setting.

Therefore, adopting the E-PDCCH enables flexible control information assignment without restriction by the setting in units of cells in addition to increasing the region of the control information. Because there is no restriction by the setting in units of cells, adopting of the E-PDCCH is expected to enable operation suitable in particular for COMP, in which coordination is made between cells, and for HetNet, in which inter-cell interference control is important.

With regard to the A/N feedback for the PDSCH assigned using the E-PDCCH as control information, the following problem occurs. Specifically, it is necessary to establish the D-A/N resources allocated to an E-PDCCH terminal so that they do not collide with the D-A/N resources used by a PDCCH terminal, and also so that there is no wasteful consumption of uplink resources.

The simplest method is to establish the A/N resource number as shown in the following equation, for example, using the fact that the E-PDCCH is constituted by one or more eCCEs (enhanced control channel elements), similar to the PDCCH.

[2]

$$n_{PUCCH}^{E\text{-}PDCCH} = f(N_e, n_{eCCE}) \qquad \text{(Equation 2)}$$

In the above, $n_{PUCCH}^{E\text{-}PDCCH}$ is the resource number with which the E-PDCCH terminal transmits the A/N, $N_e$ is the A/N resource offset value, and $n_{eCCE}$ is the number of the eCCE to which the E-PDCCH is mapped. Also, $N_e$ is the D-AN resource offset parameter, and this may be a cell-specific value, or a value given independently for each terminal individually. The function $f(a, b)$ is $f(a, b)=a+b$, for example.

This method has the advantage of not requiring notification of the A/N resource to each terminal, and also having no possibility of A/N collision between E-PDCCH terminals. However, it has difficulty in sharing the same resource between the D-A/N of the PDCCH terminal given by Equation 1 and the D-A/N of the E-PDCCH given by Equation 2. FIGS. 6A and 6B show this situation.

FIG. 6A and FIG. 6B show examples in which D-A/N regions for a PDCCH terminal and an E-PDCCH terminal are set. FIG. 6A is an example in which the two D-A/N regions are caused to overlap, and FIG. 6B is an example in which the two D-A/N regions are not caused to overlap.

In order to reserve broad PUSCH resources, it is necessary, as shown in FIG. 6A, to make a broad overlapping part between the two D-A/N regions, and reduce the total PUCCH resource region. With this type of setting, however, there is a risk of collision between the A/N signals of a PDCCH terminal and an E-PDCCH terminal. However, if a setting is made, such as shown in FIG. 6B, so that there is no overlapping of shared resources, there is no possibility of A/N signal collision. In this case, however, there is a great reduction of the amount of resources that can be allocated to the PUSCH, leading to the problem of a decrease in the uplink throughput.

Another method is a method of using RRC (radio resource control) information or the like to allocate A/N resources to each terminal beforehand.

Figure 7A:
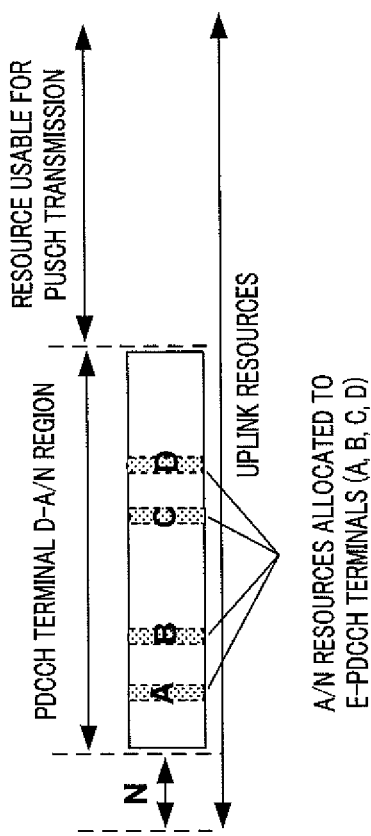
FIGS. 7A and 7B are drawings showing examples in which different A/N resources are allocated to four E-PDCCH terminals, respectively.
Figure 7B:
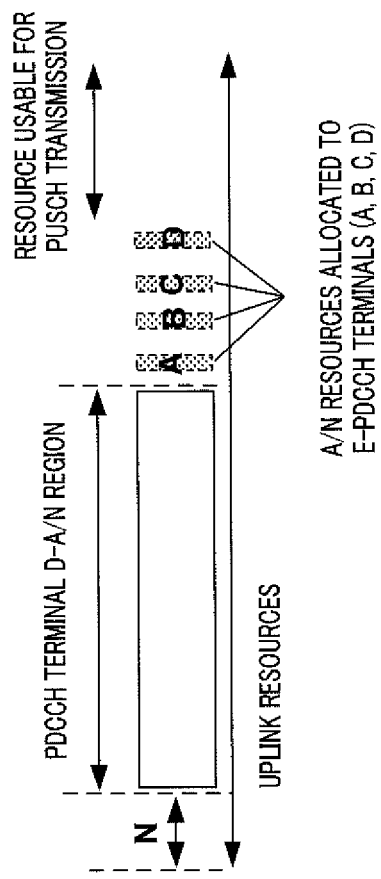

FIG. 7A and FIG. 7B show examples in which mutually different A/N resources are allocated to four E-PDCCH terminals. FIG. 7A is an example in which RRC notification A/N resources overlap in the D-A/N region, and FIG. 7B is an example in which RRC notification A/N resources do not overlap in the D-A/N region.

In this case as well, similar to using D-A/N, in the example of FIG. 7A, there is a risk of collision between the A/N signals of PDCCH and E-PDCCH terminals. In order to eliminate the possibility of A/N collision, it is necessary, as shown in FIG. 7B, to set the A/N resources of the E-PDCCH terminal outside the D-A/N resources of the PDCCH terminal. Doing this, however, reduces the PUSCH transmission band, causing a decrease in the uplink throughput.

Given the above, a communication system of Embodiment 1 simultaneously achieves (1) making the probability of collision between A/N signals of a PDCCH terminal and an E-PDCCH terminal zero and (2) increasing the utilization efficiency of the A/N resources of the PDCCH and E-PDCCH terminals.

[Overview of Communication System]

The communication system of Embodiment 1, as shown in the example of FIG. 5, includes one base station 100 and a plurality of terminals 200 or the like within a cell.

[Configuration of Base Station 100]

Figure 8:
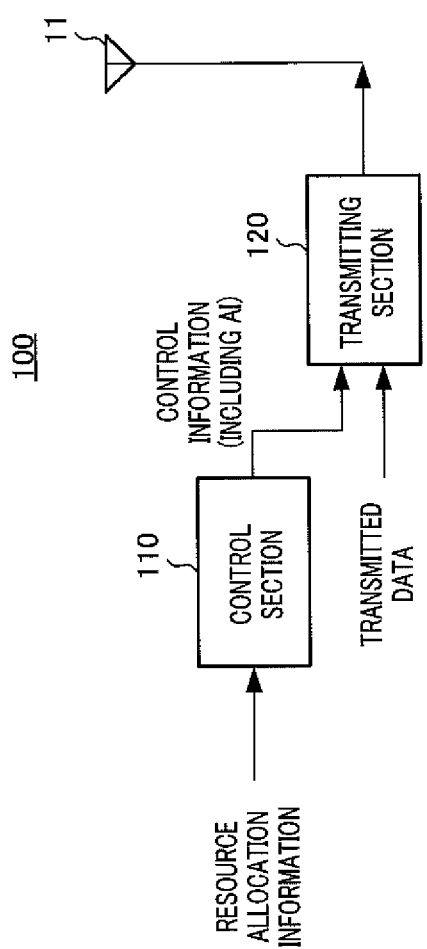
FIG. 8 is a block diagram showing the main parts of a base station of Embodiment 1.

FIG. 8 is a block diagram showing the main parts of the base station.

Base station 100, as shown in FIG. 8, has control section 110 that generates a plurality of pieces of control information to be transmitted to a plurality of terminals 200, respectively, and transmitting section 120 that converts control information and transmission data to a radio transmission signal and transmits the signal by radio via antenna 11.

Control section 110 generates control information for each terminal 200 from downlink resource allocation information or the like, and also distinguishes, based on resource allocation information and the like, whether the A/N resources allocated to the E-PDCCH terminals are to be D-A/N region resources (called D-A/N resources) or notification A/N resources specified beforehand by RRC signaling (corresponding to specified resources).

Specifically, control section 110 allocates D-A/N resources to each E-PDCCH terminal with priority, to the extent that there is no A/N resource collision between the plurality of PDCCH and E-PDCCH terminals. That is, eCCEs that are associated one-to-one with these D-A/N resources are successively reserved for transmission of E-PDCCH terminal control information. If allocation under this condition becomes difficult, control section 110 makes the A/N resources to be allocated to the remaining E-PDCCH terminals RRC notification A/N resources. The allocation of these A/N resources may be done by a higher-level node in the network, with the control section 110 receiving the allocation result and distinguishing which A/N resource has been allocated.

Control section 110 generates E-PDCCH terminal control information including an A/N indicator (hereinafter called "AI (ACK/NACK indicator)") indicating the distinguishing result and transmits it to transmitting section 120.

Transmitting section 120 transmits, by radio, the signals through the channels, which include transmission data and control data. That is, transmitting section 120 transmits, respectively, transmission data by the PDSCH, PDCCH terminal control information by the PDCCH, and E-PDCCH terminal control information by the E-PDCCH.

Figure 9:
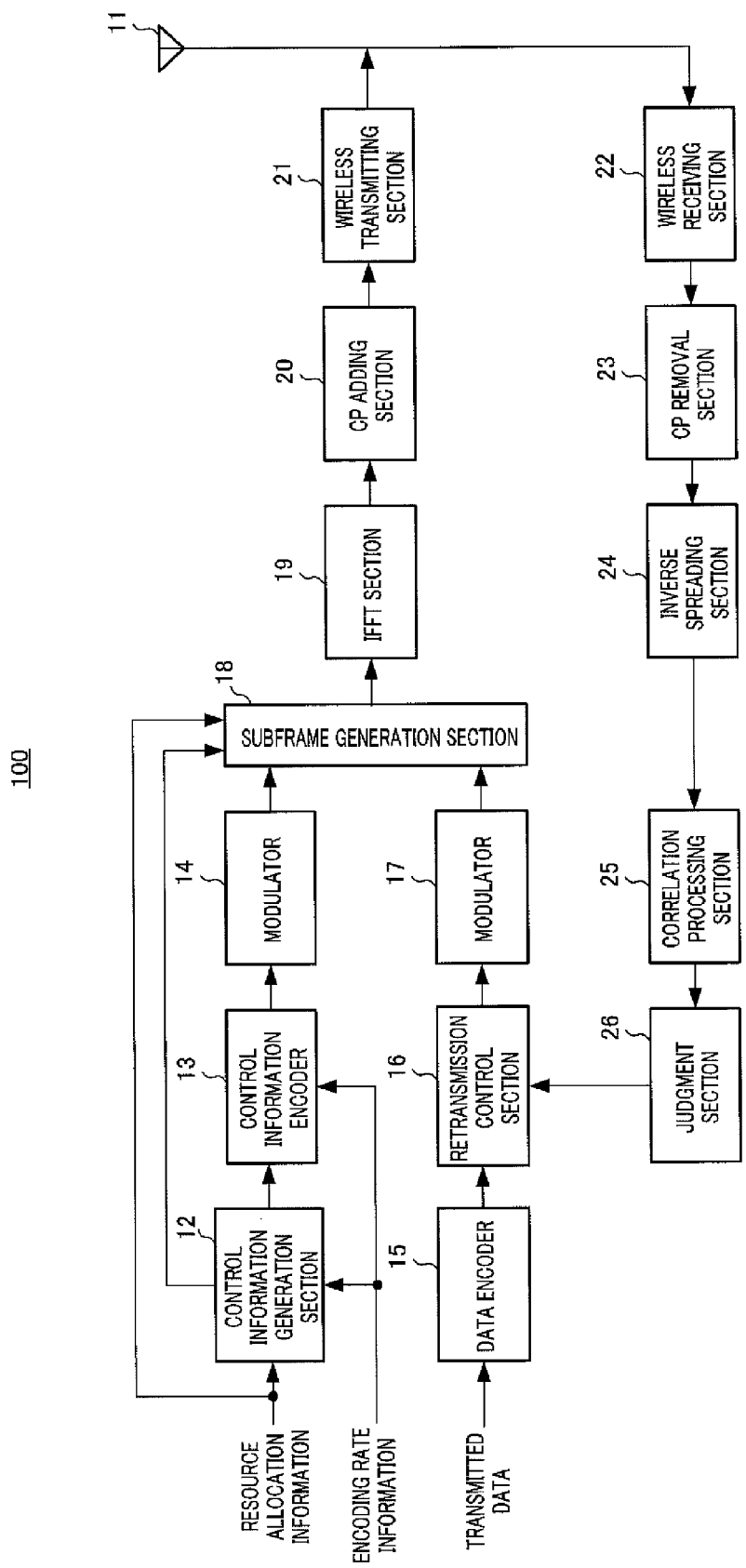
FIG. 9 is a block diagram showing the details of the base station of Embodiment 1.

FIG. 9 is a block diagram showing the details of the base station.

In detail, base station 100, as shown in FIG. 9, includes antenna 11, control information generation section 12, control information coding section 13, modulation sections 14 and 17, data coding section 15, retransmission control section 16, subframe configuration section 18, IFFT section 19, CP appending section 20, radio transmitting section 21, and the like. Base station 100 also includes radio receiving section 22, CP removal section 23, despreading section 24, correlation processing section 25, judgment section 26, and the like.

Of these constituent elements, control information generation section 12 functions mainly as control section 110, and the constituent elements from control information coding section 13 to radio transmitting section 21 and data coding section 15 to radio transmitting section 21 function mainly as transmitting section 120.

Base station 100 transmits the PDCCH, the E-PDCCH, and the PDSCH on the downlink and also receives the PUCCH carrying the A/N signal on the uplink. In this case, to avoid having the description become complex, the constituent elements related to the downlink transmission of the PDCCH, E-PDCCH, and PDSCH, which are closely connected with the features of the present embodiment, and the uplink reception of the PUCCH with respect to that downlink data are mainly shown. The constituent elements related to uplink data reception are omitted in the illustration and descriptions.

The downlink control signal and data signal generated by base station 100 are each separately encoded, modulated, and input to subframe configuration section 18.

First, the generation of the control signal will be described. Control information generation section 12 generates the control information for each terminal 200, from the resource allocation results (resource allocation information) and the coding rate information of each terminal 200 for which downlink allocation is to be done. The control information for each terminal 200 includes terminal ID information indicating for which terminal 200 the control information is intended. For example, the CRC bit masked by the ID number of terminal 200 that is the control information notification destination is included in control information as the terminal ID information. In this case, different information is included in the control information mapped onto the PDCCH and the control information mapped onto the E-PDCCH. In particular, AI, which indicates whether transmission of an A/N signal for the PDSCH is to be done by an A/N resource with an appended eCCE number or is to be done by an A/N resource of which a notification has been made by RRC beforehand is included in the control information mapped onto the E-PDCCH. The generated control information for each terminal 200 is input to control information coding section 13.

Control information coding section 13 independently encodes the control information for each terminal 200. The encoding may be done with the control information mapped onto the PDCCH and the control information mapped onto the E-PDCCH being either same or different. The output of control information coding section 13 is input to modulation section 14.

Modulation section 14 independently modulates the control information of each terminal 200. The modulation may be done with the control information mapped onto the PDCCH and the control information mapped onto the E-PDCCH being either same or different. The output of modulation section 14 is input to subframe configuration section 18.

Next, the generation of the data signal will be described. Data coding section 15 appends a CRC bit that is masked based on the ID of each terminal 200 to the data bit stream transmitted to each terminal 200 and performs error correction coding. The output of data coding section 15 is input to retransmission control section 16.

Retransmission control section 16 holds the coded transmission data for each terminal 200 and outputs the transmission data to modulation section 17 at the time of the first transmission. With respect to terminal 200 to which the NACK signal has been input from judgment section 26, that is, terminal 200 that will perform retransmission, the transmitted data for retransmission is output to modulation section 17.

Modulation section 17 performs data modulation of each of the data coded sequences for each terminal 200. The modulated streams are input to subframe configuration section 18.

Subframe configuration section 18 maps the input control information sequences and data sequences onto resources divided by the time and frequency of a subframe. By doing this, subframe configuration section 18 configures and outputs subframes to IFFT section 19.

IFFT section 19 performs an IFFT (inverse fast Fourier transform) on the transmission subframes that are input thereto, thereby obtaining a time waveform, which is input to CP appending section 20.

CP appending section 20 appends a CP to each OFDM symbol within the subframe and outputs the result to radio transmitting section 21.

Radio transmitting section 21 performs radio modulation of the input symbols to the carrier frequency band and transmits the modulated downlink signal via antenna 11. Radio receiving section 22 receives, as input, an A/N signal of terminal 200 from antenna 11 and performs radio demodulation on the input signal. The demodulated downlink signal is input to CP removal section 23.

CP removal section 23 removes the CP from each SC-FDMA (single carrier-frequency-division multiple access) symbol within the downlink signal. After removal of the CPs, the symbols are input to despreading section 24.

In order to extract the A/N of the target terminal 200 from the A/N signals of a plurality of terminals 200 that have been code multiplexed, despreading section 24 performs despreading by a corresponding orthogonal code. The despread signal is output to correlation processing section 25.

Correlation processing section 25 performs correlation processing by a ZAC sequence in order to extract the A/N. The signal after correlation processing is input to judgment section 26.

Judgment section 26 judges whether the A/N of terminal 200 is ACK or NACK. If the judgment result indicates ACK, judgment section 26 prompts retransmission control section 16 to transmit the next data. If, however, the judgment result indicates NACK, judgment section 26 prompts retransmission control section 16 to perform retransmission.

[Configuration of Terminal 200]

Figure 10:
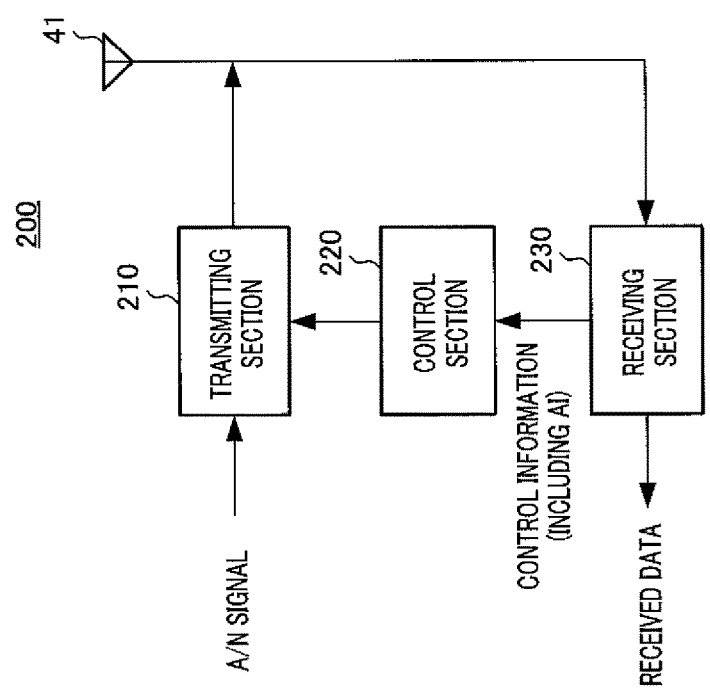
FIG. 10 is a block diagram showing the main parts of a terminal in Embodiment 1.

FIG. 10 is a block diagram showing the main parts of a terminal.

Terminal 200 includes receiving section 230 that receives control information and downlink data via antenna 41, control section 220 that determines the resource used for transmitting the A/N signal, based on the control information, and transmitting section 210 that transmits the A/N signal using the determined resource.

If terminal 200 is specified to receive E-PDCCH control information, terminal 200 becomes an E-PDCCH terminal, and if terminal 200 is specified to receive PDCCH control information, terminal 200 becomes a PDCCH terminal.

Receiving section 230 receives received data via the PDSCH, and control information via the E-PDCCH or PDCCH. That is, in the case of E-PDCCH terminal 200, receiving section 230 receives control information including AI via the E-PDCCH, and in the case of PDCCH terminal, receives control information via the PDCCH. Receiving section 230 outputs the received control information to control section 220.

In the case of E-PDCCH terminal 200, control section 220 determines the transmission resource for the A/N signal of the received data, based on the AI value, to be either a D-AN resource or an RRC notification. A/N resource. In the case of PDCCH terminal 200, control section 220 determines the A/N signal transmission resource in the same manner as a conventional PDCCH terminal. Control section 220 outputs the details of the determination to transmitting section 210.

Transmitting section 210 uses the determined resource to transmit the A/N signal of the received data by radio.

Figure 11:
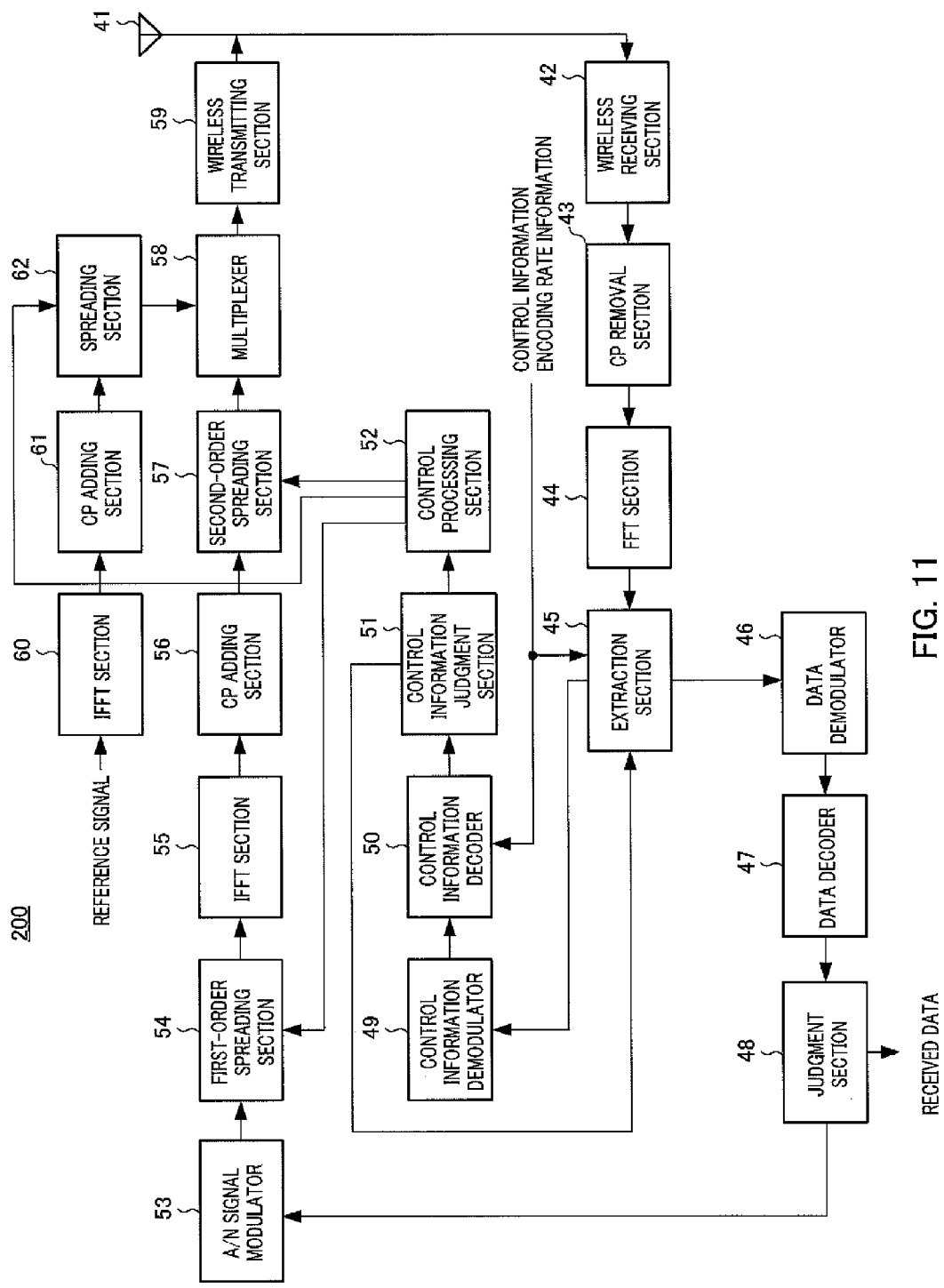
FIG. 11 is a block diagram showing the details of the terminal in Embodiment 1.

FIG. 11 is a block diagram showing the details of a terminal.

As shown in FIG. 11, specifically, terminal 200 includes antenna 41, radio receiving section 42, CP removal section 43, FFT section 44, extraction section 45, data demodulation section 46, data decoding section 47, judgment section 48, control information demodulation section 49, control information decoding section 50, control information judgment section 51, control processing section 52, A/N signal modulation section 53, primary spreading section 54, IFFT section 55, CP appending section 56, secondary spreading section 57, multiplexing section 58, and radio transmitting section 59. Terminal 200 also includes IFFT section 60, CP appending section 61, and spreading section 62.

Of the above constituent elements, control processing section 52 mainly functions as control section 220. Constituent elements from A/N signal modulation section 53 to radio transmitting section 59 mainly function as transmitting section 210, and constituent elements from radio receiving section 42 to judgment section 48 and from radio receiving section 42 to control information judgment section 51 mainly function as receiving section 230.

Terminal 200 receives, on the downlink, control information mapped onto the PDCCH or E-PDCCH, and downlink data mapped onto the PDSCH. Terminal 200 transmits the PUCCH on the uplink. In this case, to avoid having the description become complex, only the constituent elements related to downlink reception (specifically, PDCCH, E-PDCCH, and PDSCH), which are closely connected with the features of the present embodiment, and related to the uplink transmission (specifically, PUCCH) with respect to the downlink received data are indicated.

Radio receiving section 42 inputs the input from antenna 42 that has received the downlink signal transmitted from the base station, performs radio demodulation, and outputs the demodulated signal to CP removal section 43.

CP removal section 43 removes the CP from each OFDM symbol time waveform within the subframe and outputs the result to FFT section 44.

FFT section 44 performs an FFT (fast Fourier transform) on the received time waveform in order to perform demodulate OFDM (orthogonal frequency division multiplexing) demodulation, thereby obtaining a subframe in the frequency domain. The obtained received subframe is input to extraction section 45.

Extraction section 45 extracts the control information intended for the terminal itself from either the PDCCH region or the E-PDCCH region. Information indicating in which one of the PDCCH and the E-PDCCH the control information is included is specified beforehand from the base station (not shown). Extraction section 45 extracts one or a plurality of control information candidates from a control information region onto which the control information of the terminal itself is possibly mapped, and outputs the candidate to control information demodulation section 49. When a result is obtained from control information judgment section 51, extraction section 45 extracts a data signal intended for the terminal from the received subframe based on the resource allocation result included in the control information intended for the terminal. The obtained data signal is input to data demodulation section 46.

Control information demodulation section 49 demodulates one or more input control information and outputs the result to control information decoding section 50.

Control information decoding section 50 decodes one or more input demodulated sequences. The decoding result is input to control information judgment section 51.

Control information judgment section 51 judges, from the one or more decoding results, the control information intended for the terminal, using the terminal ID information. The judgment uses, for example, the CRC bit that is masked by the ID information of the terminal itself included in the control information. If there is control information intended for the terminal itself, control information judgment section 51 outputs that control information to extraction section 45. Control information judgment section 51 outputs the control information to control processing section 52.

Control processing section 52 operates differently between the case of PDCCH terminal 200 and the case of E-PDCCH terminal 200.

In the case of PDCCH terminal 200, control processing section 52 obtains the resource number of the A/N signal based on Equation 1 from the number of the resource (CCE) onto which the control information is mapped. From the obtained A/N signal resource number, control processing section 52 determines the spreading codes used for primary spreading, secondary spreading, and the reference signal, and the frequency resource block (RB) transmitting the PUCCH. This information is input to primary spreading section 54, secondary spreading section 57, and to spreading section 62 of the reference signal.

In contrast, in the case of E-PDCCH terminal 200, control processing section 52, based on a value indicated by the AI included in the control information, determines whether to obtain the resource number of the A/N signal by Equation 2, or use the A/N resource indicated as RRC control information. In this case, it is assumed that the RRC notification A/N resource is specified to terminal 200 by base station 100 beforehand (not shown). If terminal 200 is specified to determine the A/N signal resource number in accordance with Equation 2, control processing section 52 determines from the determined A/N signal resource number each spreading code used for primary and secondary spreading and the reference signal, and the frequency resource block (RB) for transmitting the A/N signal. Control processing unit 52 notifies primary spreading section 54, secondary spreading section 57, and the reference signal spreading section 62 of the corresponding spreading code. In contrast, if terminal 200 is specified to use the RRC notification resource, control processing section 52 determines each spreading code used for primary spreading, secondary spreading, and the reference signal corresponding to that A/N resource number, and the frequency resource block (RB) for transmitting the PUCCH. Control processing section 52 notifies primary spreading section 54, secondary spreading section 57, and the reference signal spreading section 62 of the corresponding spreading code.

Data demodulation section 46 demodulates the input data signal intended for the terminal itself. The result of the demodulation is input to data decoding section 47. Data decoding section 47 decodes the input demodulated data. The result of the decoding is input to judgment section 48.

Judgment section 48 uses the CRC masked by the ID of terminal 200 to judge whether or not the decoding result is correct. If the decoding result is correct, judgment section 48 outputs the ACK signal to A/N signal modulation section 53 and extracts the received data. If the decoding result is not correct, judgment section 48 outputs the NACK signal to A/N signal modulation section 53.

A/N signal modulation section 53, depending upon whether the input signal is ACK or NACK, generates modulated symbols having different values. The generated demodulated symbol is input to primary spreading section 54.

Primary spreading section 54 uses the ZAC sequence input from control processing section 52 to perform primary spreading of the A/N signal and outputs the A/N signal after primary spreading to IFFT section 55. In this case, because the cyclic shift value used for cyclic shift hopping differs in units of SC-FDMA, primary spreading section 54 uses a different cyclic shift value for each SC-FDMA symbol to perform primary spreading of the A/N signal.

IFFT section 55 performs an IFFT of each SC-FDMA symbol input from primary spreading section 54 and outputs the obtained time waveform to CP appending section 56.

CP appending section 56 appends a CP to each input SC-FDMA time waveform and outputs this signal to secondary spreading section 57.

Secondary spreading section 57 uses a block-wise spreading code sequence to perform secondary spreading of the SC-FDMA time waveform after the appending the CP. The spreading code used is a code specified by control processing section 52. The stream that has been subjected to secondary spreading is input to multiplexing section 58.

Multiplexing section 58 time-multiplexes the two input sequences received as input from the spreading section 62 for the reference signal and secondary spreading section 57, thereby generating a PDCCH subframe. The time multiplexed signal is input to radio transmitting section 59.

Radio transmitting section 59 performs radio modulation of the input signal to the carrier frequency band and transmits the uplink signal by radio from antenna 41.

[Operation]

The processing flow of base station 100 and terminal 200 in Embodiment 1 will be described by step (1) through step (6).

Figure 12:
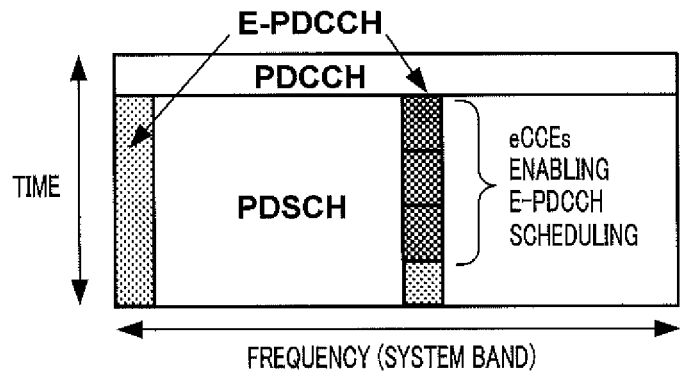
FIG. 12 is a drawing showing an example of E-PDCCH scheduling in Embodiment 1.
Figure 13:
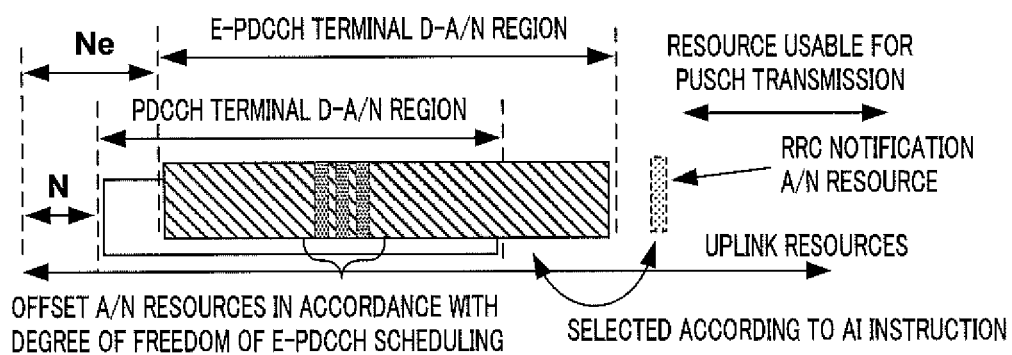
FIG. 13 a drawing describing A/N resources of an E-PDCCH terminal switched based on AI.

FIG. 12 shows an example of the E-PDCCH scheduling in Embodiment 1, and FIG. 13 describes the A/N resources of an E-PDCCH terminal that is switched based on AI.

Step (1): Before PDSCH transmission/reception, base station 100 notifies each terminal 200 whether control information is to be transmitted by the PDCCH or by the E-PDCCH. No particular notification need be made to terminal 200 to which transmission is not performed using the E-PDCCH. If, in particular, there is no notification or recognition is not possible, terminal 200 receives control information while assuming that the control information is transmitted on the PDCCH. Terminal 200 for which control information is transmitted on the E-PDCCH is notified beforehand of the A/N resource to be used in the case where there is an instruction by AI to use an A/N resource. These notifications use the RRC control signal or the like. If there is no A/N resource instruction or recognition is not possible, the terminal determines the A/N resource based on Equation 2.

Step (2): Base station 100 determines the terminal 200 for assignment of data in each subframe and performs scheduling within the PDSCH. The scheduling uses, in addition to the amount of traffic to each terminal 200, the CSI feedback and sounding reference signal (SRS) transmitted by terminal 200 and the like.

Step (3): Base station 100 generates control information including the scheduling results intended for each terminal 200 and maps it onto the PDCCH and the E-PDCCH. At first, base station 100 performs mapping onto the PDCCH. Because the CCE regions where blind decoding is performed are different for each terminal 200, base station 100 maps control information onto a decodable region for each terminal 200. When this is done, because control information is not mapped onto the same CCE between PDCCH terminals 200, as long as A/N resources based on Equation 1 are used, there is no A/N resource collision between PDCCH terminals 200.

Next, base station 100, as shown in FIG. 12, maps control information onto the E-PDCCH. In the E-PDCCH as well, because the eCCE regions where blind decoding is performed are different for each terminal 200, base station 100 attempts to map control information onto a decodable region for each terminal 200. As shown in FIG. 13, in mapping for an E-PDCCH terminal 200, in the case of using an A/N resource based on Equation 2, base station 100 verifies whether or not there is collision with the A/N resources of PDCCH terminal 200.

In this case, an A/N resource based on Equation 2 is one of a plurality of A/N resources included in the "E-PDCCH terminal D-A/N region" of FIG. 13 and is an A/N resource in a one-to-one association with an eCCE number onto which control information is mapped. The D-A/N region for E-PDCCH terminal and the D-A/N region for PDCCH terminal D-A/N regions are set so that the majority (or all) thereof overlap.

If the verification result indicates that collision will not occur, base station 100 uses that mapping, and instructs terminal 200 to use the A/N resource based on Equation 2 according to AI. Meanwhile; if it is found that collision will occur with the allocation based on Equation 2, base station 100 attempts to see if the control information can be mapped onto a different eCCE. If collision can be avoided by mapping onto a different eCCE, base station 100 changes the mapping position and gives an instruction so as to use an A/N resource based on Equation 2 according to AI.

On the other hand, if it appears that collision cannot be avoided by changing the mapping, base station 100 makes an instruction so that the A/N resource indicated beforehand by RRC according to AI ("RRC notification A/N resource" in FIG. 13) is used. That is, the AI value included in the control information determines the value that represents the instruction for the RRC notification A/N resource. The RRC notification A/N resource is set to a resource region in which there is collision in neither the D-A/N region for a PDCCH terminal nor the D-A/N region for an E-PDCCH terminal.

Step (4): When the control information mapping for all terminals 200 is completed, base station 100 transmits, by radio, PDCCH and E-PDCCH control information and PDSCH downlink data using the downlink.

Step (5): Terminal 200 obtains from the received signal the control information intended for terminal 200 and extracts and decodes the data signal. Simultaneously, terminal 200 identifies the code and frequency resources for transmitting the A/N signal corresponding to the received data signal based on the control information. In particular, from the AI included in the control information, E-PDCCH terminal 200 determines whether to use the A/N resource based on Equation 2 or to use the A/N resource indicated by the RRC beforehand. In the case of using the D-AN resource, the D-A/N resource based on Equation 2 is calculated based on the eCCE number onto which the control information intended for E-PDCCH terminal 200 is mapped.

Step (6): Terminal 200 identifies either ACK or NACK, in accordance with the judgment result of the data signal, and transmits the A/N signal using the A/N resources (code and frequency resources) identified as noted above.

[Effect]

As described above, base station 100 and terminal 200 according to Embodiment 1, because of the degree of freedom in EPDCCH scheduling and dynamic selection by AI, the A/N of E-PDCCH terminal 200 can be placed in an available D-A/N resource for a PDCCH terminal. It is therefore possible to increase the utilization efficiency of A/N resources and avoid wasted PUSCH bandwidth reduction, while maintaining a zero probability of A/N collision.

According to Embodiment 1, in a case where collision occurs when a D-AN resource is allocated, an RRC notification A/N resource can be allocated by dynamic selection by AI. The A/N collision probability can be maintained at zero, without being influenced by an increase or decrease in the number of A/Ns of PDCCH terminals 200 and E-PDCCH terminals 200.

The dynamic selection by AI can be easily implemented by the same type of arrangement (that is addition of a bit) as the ARI (ACK/NACK resource indicator) of the PUCCH format 3 in Rel. 10.

The ARI is a bit included in the PUCCH control information and is information that indicates an instruction regarding which of a plurality of A/N resources indicated by RRC beforehand is to be used. In PUCCH format 3, A/N resources indicated beforehand by RRC are selected based on an ARI instruction. For this reason, unlike Embodiment 1, ARI alone cannot make it possible to avoid A/N collision between PDCCH terminal 200 and E-PDCCH terminal 200 by utilizing the E-PDCCH scheduling degree of freedom.

Additionally, according to Embodiment 1, the utilization efficiency of D-A/N regions can be improved, so that the frequency of occurrence of RRC Reconfig can be reduced. For example, if PDCCH terminals 200 become very small in number, base station 100 may instruct E-PDCCH terminals 200 according to AI so that A/N resources based on Equation 2 are always used. That is, in this case as well, it is not necessary to change the D-A/N region for the PDCCH terminal by RRC Reconfig. Because there is no mapping of control information onto the same eCCE between E-PDCCH terminals 200, A/N collision between E-PDCCH terminals 200 does not occur.

Also, according to Embodiment 1, the conventional PDCCH terminals can be added to the communication system without any change. That is, in the communication system of Embodiment 1, because there is no need to add a new bit to the PDCCH, the PDCCH coverage can be maintained. The scheduler of PDCCH can perform scheduling in the same manner as in the case where there are no E-PDCCHs, and the operation of conventional terminals existing before the introduction of E-PDCCH is not affected.

(Variation 1)

The communication system of Embodiment 1 can achieve the same effect even if the following change are made thereto.

For example, the function f of Equation 2 may be applied to any one function that is different from Equation 1. For example, this may be a function f such as Equation 3 or Equation 4.

[3]

$$n_{PUCCH}^{E\text{-}PDCCH} = f(N_e, n_{eCCE}) = (N_e + n_{eCCE}) \bmod X \quad \text{(Equation 3)}$$

[4]

$$n_{PUCCH}^{E\text{-}PDCCH} = f(N_e, n_{eCCE}) = N_e \times n_{eCCE} \quad \text{(Equation 4)}$$

In the above, X is a positive integer.

The method of giving the eCCE number with respect to a channel element of E-PDCCH may be any one method. For example, it may be made the eCCE number $n^{PRB}_{eCCE}$ that is applied in units of frequency resource blocks, and may be made the eCCE number $n^{UE}_{eCCE}$ that is applied in units of terminals 200.

Additionally, in place of the eCCE number, it is possible to use a function that determines an A/N resource based on a resource unit smaller than eCCE, this being an eREG (enhanced resource element group) index, which is the REG (resource element group) in an E-PDCCH.

The function f is not restricted to being an eCCE number or an eREG number, and may be a function using antenna port number as a parameter.

The method of giving the function f and the eCCE number (or eREG number) may be predetermined, or may be made settable or changeable by base station 100.

(Variation 2)

Although Embodiment 1 has been described with one bit being sufficient information for AI, AI may have a plurality of bits. In the case of a plurality of bits, rather than giving an instruction for an A/N resource attached to an eCCE based on a single function (Equation 2), an instruction may be given, using a plurality of different functions, for an A/N resource associated with an eCCE number.

For example, if AI is two bits (four values), instructions can be given by base station 100 to terminal 200 as shown below, by the value of AI.

[5]

$$AI=0 \Rightarrow n_{PUCCH}^{E-PDCCH} = f_1(N_e, n_{eCCE})$$

$$AI=1 \Rightarrow n_{PUCCH}^{E-PDCCH} = f_2(N_e, n_{eCCE})$$

$$AI=2 \Rightarrow n_{PUCCH}^{E-PDCCH} = \text{RRC notification resource } A$$

$$AI=3 \Rightarrow n_{PUCCH}^{E-PDCCH} = \text{RRC notification resource } B$$

(Equation 5)

In the above, for example, the functions $f_1$ and $f_2$ used may be $f_1(a, b) = a+b$ and $f_2(a, b) = a+b+1$ or the like. The functions of Equation 3 and Equation 4 may be used as the functions $f_1$ and $f_2$.

Adopting this configuration enables more flexible A/N resource selection. Because PDCCHs of different terminals 200 are rarely mapped onto consecutive CCEs, if the settings of $f_1(a, b) = a+b$ and $f_2(a, b) = a+b+1$ or the like are made, base station 100 can find an allocation that has no A/N collision with a small amount of calculation.

Additionally, in such cases as well, a plurality of different predetermined functions may be used, and functions changeable by notification from base station 100 may be used.

(Variation 3)

Although in Embodiment 1 the description has been for the example of a configuration in which AI, which explicitly indicates the method of selecting A/N resources is included E-PDCCH control information, the A/N resource selection method may be made switchable, based on a rule having the following characteristics.

Characteristic: When transmission is done in a mode that has a high degree of scheduling freedom, A/N resources of Equation 2 are used, and when transmission is done in a mode with a low degree of scheduling freedom, RRC notification A/N resources are used.

Specifically, distinction between a mode having a high degree of scheduling freedom and a mode having a low degree of scheduling freedom is possible by the following conditions (1) to (3).

(1) In the Localized mode, when the E-PDCCH radio signal is transmitted, an A/N resource associated with an eCCE number is used, and in the Distributed mode, when the E-PDCCH radio signal is transmitted, the A/N resource indicated by RRC is used. In this case, the Localized mode is a mode in which an E-PDCCH is placed only in a specific PRB (physical resource block), and the assignment of eCCE numbers differs between terminals 200. The Distributed mode is a mode in which an E-PDCCH is placed over a plurality of PRBs, and the assignment of eCCE numbers is common between a plurality of terminals.

The Localized mode is operation in which control information is placed together in a specific frequency resource, and which has a higher degree of scheduling freedom compared with the Distributed mode in which control information is distributed among a large number of frequency resources.

(2) When the E-PDCCH aggregation level is low, an A/N resource associated with an eCCE number is used, and when the aggregation level is high, an A/N resource indicated by RRC is used. When the E-PDCCH aggregation level is high, base station 100 makes the coding rate of control information low and uses many eCCEs to transmit control information. Because the lower the aggregation level is, the smaller the size of the control information is, the degree of scheduling freedom increases.

(3) When transmission has been done in the UE-specific search space, an A/N resource associated with an eCCE number is used, and when transmission has been done by a common search space, an A/N resource indicated by RRC is used. Because the UE-specific search space is larger than the common search space, the degree of scheduling freedom increases.

The condition for switching the method of selecting the A/N resources may be established as any of the conditions (1) to (3), and may be made settable and changeable to one of these conditions by notification from base station 100.

By adopting a configuration such as this, when the E-PDCCH scheduling degree of freedom is high, scheduling enables avoiding a reduction of the PUSCH band, while also avoiding A/N collision between PDCCH terminal 200 and E-PDCCH terminal 200. Also, when the E-PDCCH scheduling degree of freedom is low, using an A/N resource indicated by RRC can reliably avoid collision between PDCCH terminal 200 and E-PDCCH terminal 200.

Therefore, adopting this type of configuration makes it possible to avoid A/N collision between PDCCH terminal 200 and E-PDCCH terminal 200 without unnecessary reduction of the PUSCH band, even without adding any AI bit.

Embodiment 2

Background of Obtaining an Embodiment of the Present Invention

First, before describing the specific configuration and operation of Embodiment 2, one method that the inventors noticed as a method for allocating A/N resources in the case of adopting the E-PDCCH will be described.

Figure 14:
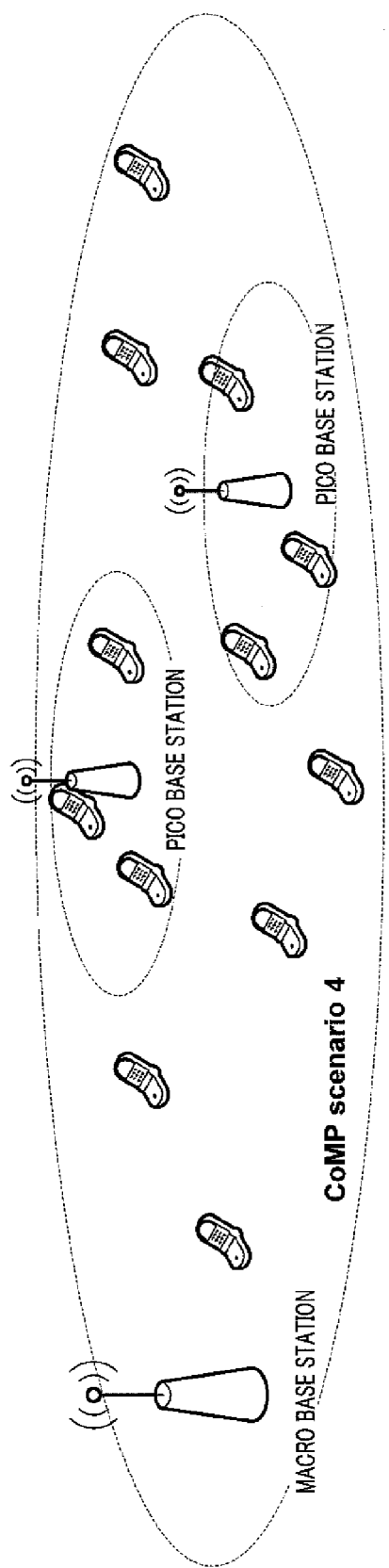
FIG. 14 is a drawing showing an example of the configuration of a communication system supporting CoMP scenario 4.

The CoMP scenario 4 is operation that is expected to increase the number of terminals in the coverage area, using E-PDCCH. FIG. 14 shows an example of the configuration of a communication system adopting CoMP scenario 4. First, at this point an example in which no E-PDCCH is used is shown. A plurality of pico nodes are placed within a cell of a macro base station that forms a large cell (in CoMP scenario 4, a macro base station being hereafter called a macro node and a pico base station being hereafter called a pico node). In CoMP scenario 4, these nodes are operated by a single cell ID. In this CoMP scenario 4, because cooperative transmission on the downlink and cooperative reception on the uplink can be done using a plurality of nodes, it is possible to maintain a good linking condition of the terminals. Therefore, CoMP scenario 4 is expected to be able to achieve a high throughput per terminal over a wide range.

Figure 15:
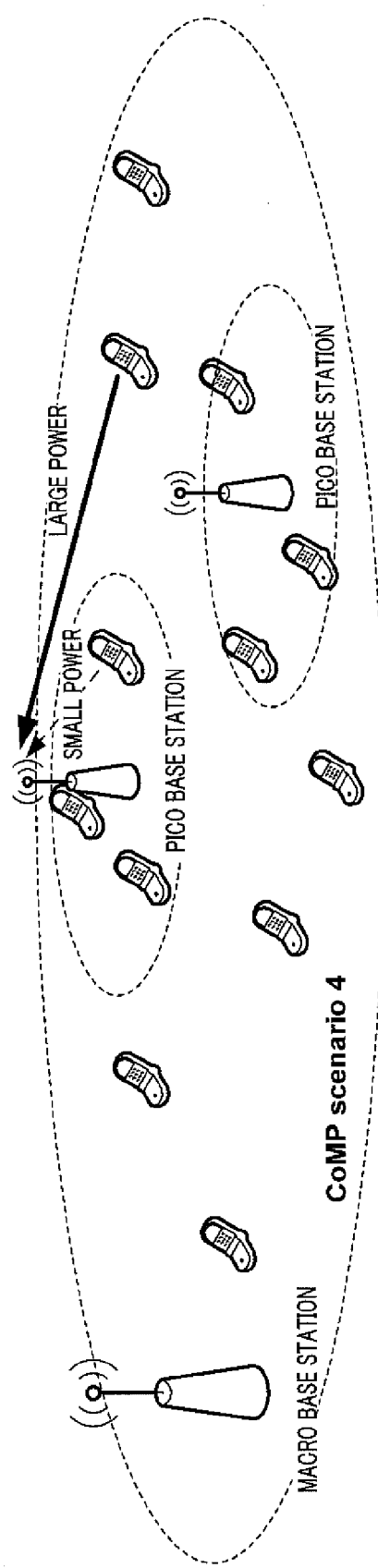
FIG. 15 is a drawing showing a situation in which A/N signals interfere with each other in a communication system supporting COMP scenario 4.

With CoMP scenario 4, however, the problem of interference between A/N signals between terminals controlled by the conventional PDCCH has been pointed out (refer to Non-Patent Literature 4). This is because the terminal cannot properly measure the path loss up to the receiving node, and cannot control the transmitting power appropriately. The terminal estimates the path loss based on the received power of the CRS (cell-specific reference signal), and transmits the A/N signal using the PUCCH, with a transmitted power that compensates for the path loss. In CoMP scenario 4, there are two cases, these being the case in which only the macro node transmits the CRS and the case in which the macro node and the pico node transmit the same CRS at one time, and in either case, it is not possible to properly estimate the path loss up to the receiving node. In particular, therefore, a large difference occurs between the received powers at a terminal in proximity to a pico node and at a terminal at a macro cell edge. This situation is shown in FIG. 15. In a case where the A/N signals of two terminals are code multiplexed, mutual interference (a near-far problem) occurs when A/N signals transmitted with significantly different powers at a pico node. The result is that the A/N signals cannot be properly received, and the problem of a significant decrease in downlink throughput has been pointed out.

Given the above, in order to avoid A/N signal interference up until now, rather than using a cell-specific value as the offset value N in Equation 1, a method has been proposed of giving this by terminal-specific signaling (refer to Non-Patent Literature 5). This shifts the D-A/N regions of a terminal in proximity to a node and another terminal, as shown in FIG. 16, thereby enabling frequency multiplexing without performing code multiplexing.

Figure 16:
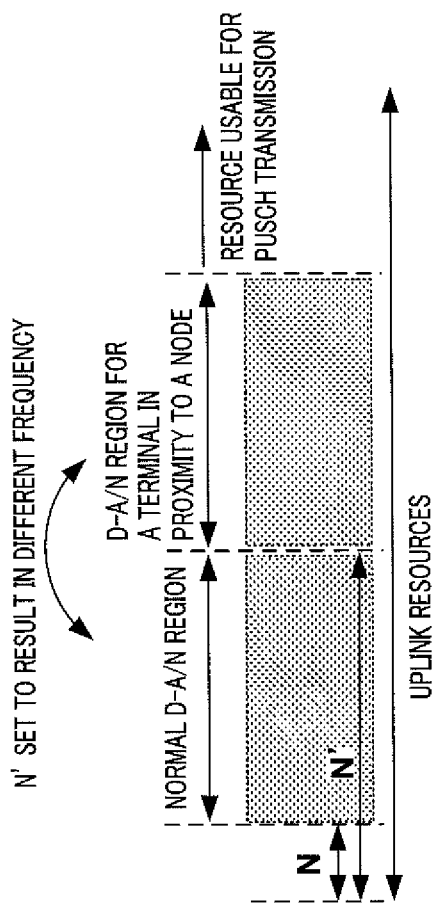
FIG. 16 is a drawing showing an example in which two D-A/N regions are set for a PDCCH terminal.

FIG. 16 describes an example in which two D-A/N regions are set for PDCCH terminals.

The specific method of implementation uses the following equation for some of the terminals.

[6]

$$n_{PUCCH} = N' + n_{CCE}$$ (Equation 6)

In the above, N' is the A/N resource offset parameter indicated by terminal-specific RRC signaling or the like. As shown in FIG. 16, by separating N from N', it is possible to separate a D-A/N region for a terminal in proximity to a node and a D-A/N region for a normal terminal. A parameter that directly indicates a frequency resource block number that is the starting point of a D-A/N region for a terminal in proximity to the node may also be used as N'.

However, when D-A/N regions are divided into a plurality of regions, there is the drawback of the frequency resources usable for PUSCH being reduced. In the example shown in FIG. 16 as well, because the number of D-A/N regions is doubled, there is a commensurate reduction in the resources usable for PUSCH transmission. Furthermore, introduction of E-PUCCH and an increase in the number of terminals in the coverage area at one time requires reserving even more A/N resources.

Figure 17:
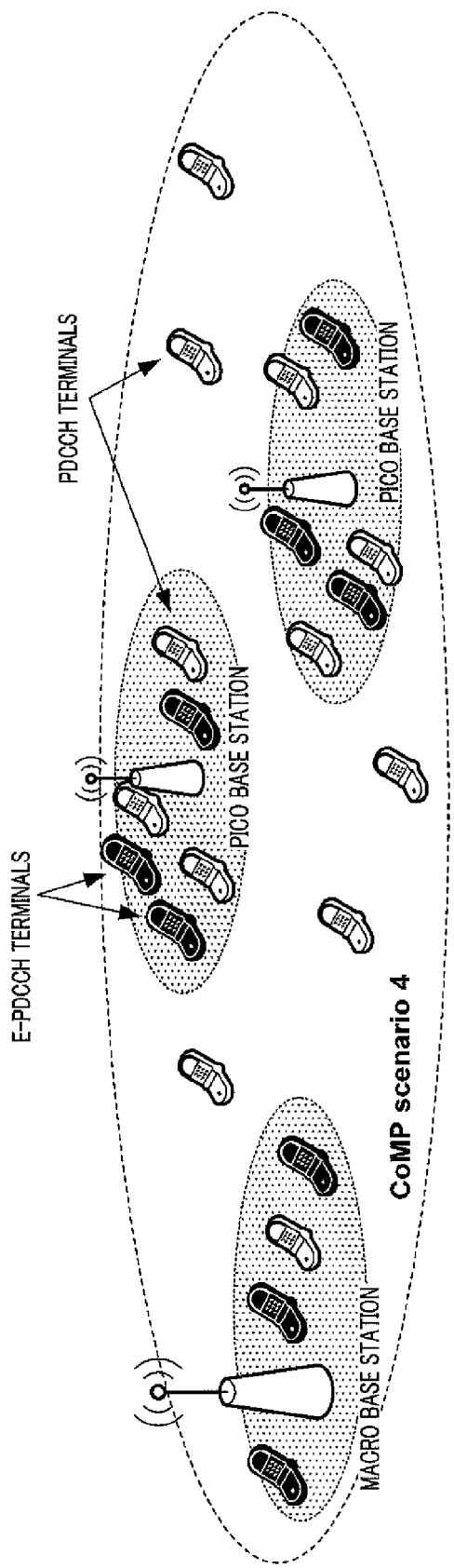
FIG. 17 is a drawing showing an example of E-PDCCH operation accommodating CoMP scenario 4.

FIG. 17 describes an operation example of an E-PDCCH supporting CoMP scenario 4.

CoMP scenario 4, as shown in FIG. 17, presumes that E-PDCCH will mainly be used for terminals in proximity to a node (E-PDCCH terminals being shown black in FIG. 17). Although using E-PDCCH increases the number of terminals in the coverage area, as shown in the drawing, the problem occurs of leading to loss of PUSCH resources in the uplink.

The communication system of Embodiment 2 adopts CoMP scenario 4 and has as an object to increase the A/N resource utilization efficiency of PDCCH and E-PDCCH terminals, while maintaining a zero probability of A/N signal collision between PDCCH and E-PDCCH terminals.

[Overview of Communication System]

The communication system of Embodiment 2, as shown in FIG. 17, includes one or more nodes (macro base stations, pico base stations) and a plurality of terminals.

A pico base station may be one such as an RRH (remote radio head). The macro base station and the pico base stations are connected by a low-delay, high-capacity interface such as an optical fiber, and constitute a CoMP set. Embodiment 2, presumes the case in which all nodes within the CoMP set operate with the same cell ID (that is, CoMP scenario 4). That is, PDCCH terminal 200 within the CoMP set is controlled by a single PDCCH. In the following, to avoid having the description become complex, constituent elements that are the same as in Embodiment 1 are assigned the same reference signs, and only the difference with respect to Embodiment 1 will be described.

[Configuration of Base Station]

The configuration of base station (macro base station, pico base stations) 100 differs from Embodiment 1 mainly in the difference in the processing done by control section 110, with other parts being the same as Embodiment 1. However, a plurality of base stations 100 are disposed within a macrocell, and as described above, these base stations are connected by a low-delay, high-capacity interface and form a CoMP set. The details of the processing done by control section 110 will be described in detail in the description of operation to follow.

[Configuration of Terminal]

The configuration of terminal 200 differs mainly by the difference in the processing done by control section 220, with other parts being the same as in Embodiment 1. The details of the processing done by control section 220 will be described in detail in the description of operation to follow.

[Operation]

The processing flow of base station 100 and terminal 200 in Embodiment 2 will be described by step (1) through step (6).

Figure 18:
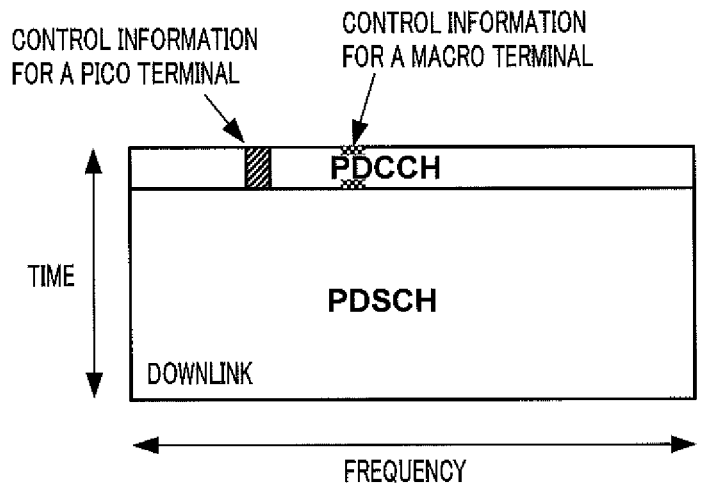
FIG. 18 is a drawing showing a mapping example of PDCCH control information in Embodiment 2.
Figure 19:
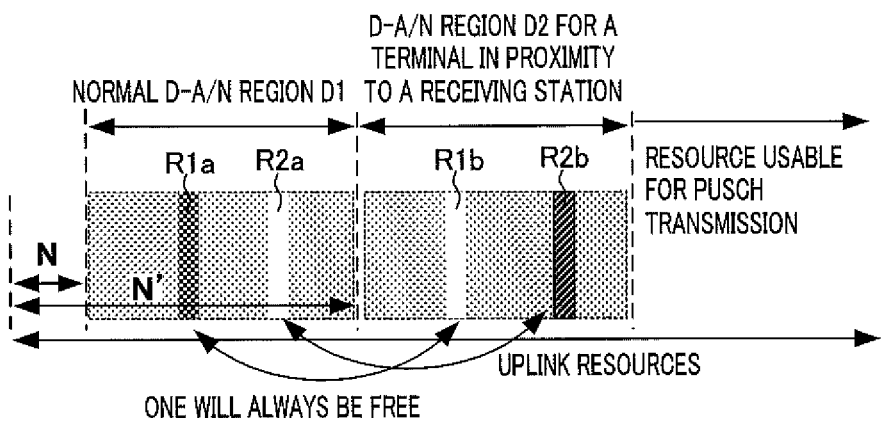
FIG. 19 is a drawing showing an example of A/N resource allocation to a PDCCH terminal in Embodiment 2.
Figure 20:
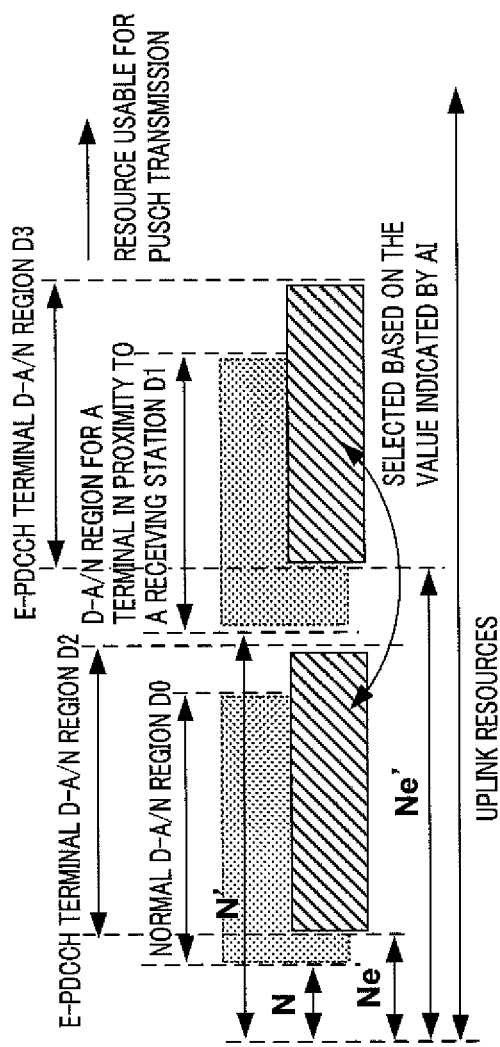
FIG. 20 is a drawing showing an example of A/N resource allocation to an E-PDCCH terminal and a PDCCH terminal in Embodiment 2.

FIG. 18 shows a mapping example of PDCCH control information in Embodiment 2. FIG. 19 shows an example of A/N resource allocation to a PDCCH terminal in Embodiment 2. FIG. 20 shows an example of A/N resource allocation to an E-PDCCH terminal and a PDCCH terminal in Embodiment 2.

Step (1): Before transmission and reception of a PDSCH, base station 100 notifies each terminal 200 whether control information will be transmitted by the PDCCH or transmitted by the E-PDCCH. Terminal 200 to which control information is not transmitted on E-PDCCH needs no particular notification. When receiving no particular notification, terminal 200 performs reception while assuming that control information is transmitted on the PDCCH. In Embodiment 2, as shown in FIG. 19, a plurality of D-A/N regions D0 and D1 are used to reserve A/N resources for PDCCH terminal 200. Therefore, with respect to some terminals 200 that have been notified of transmission by PDCCH, notification is made of a parameter for instructing a D-A/N region D1 that is not a D-A/N region D0 determined by a cell-specific parameter. Specifically, notification is made of N' in Equation 5 by terminal-specific RRC signaling. This makes it possible to clearly separate the D-A/N regions D0 and D1 and not to perform code multiplexing for terminal 200 in proximity to a node and terminal 200 (FIG. 19). When there is no particular notification, terminal 200 uses the cell-specific parameter N. That is, the D-A/N resources are allocated based on Equation 1.

Step (2): Before transmission and reception of a PDSCH, base station 100 notifies terminal 200, which has been notified of transmission of control information by E-PDCCH, of a plurality of resource offset parameters. Specifically, notification is made of two values as the resource offset parameter $N_e$ in Equation 2 (hereinafter noted as $N_e$ and $N_e'$ to enable distinction; refer to FIG. 20) by terminal-specific RRC signaling or the like.

Parameters N, N', $N_e$, and $N_e'$ are set as shown in FIG. 20. Specifically, base station 100 sets the parameters so that the majority (or all) of the normal D-AN region D0 for PDCCH terminals and one D-A/N region D2 for an E-PDCCH terminal overlap. Base station 100 also sets the parameters so that the majority (or all) of the D-A/N region D1 for a PDCCH terminal in proximity to a receiving station and another D-A/N region D3 for an E-PDCCH terminal overlap. In this case, the settings are made so that the two D-A/N regions D0 and D1 are mutually separate in the frequency domain, and that the two D-A/N regions D2 and D3 are mutually separated in the frequency domain.

Step (3): Base station 100 generates control information including the scheduling results intended for each terminal 200, and maps this control information onto PDCCH and E-PDCCH. At first, base station 100, as shown in FIG. 18, maps control information onto PDCCH. Because the CCE regions where blind decoding is performed are different for each terminal 200, control information is mapped onto a decodable region for each terminal 200.

When this is done, because control information is not mapped onto the same CCE between PDCCH terminals 200, as long as A/N resources based on Equation 1 are used, there is no A/N resource collision between PDCCH terminals 200. Also, because at step (1) terminal 200 that is in proximity to a node and terminal 200 that is not are separated into the plurality of D-A/N regions D0 and D1 so that there is no A/N code multiplexing, interference caused by PUCCH power difference does not occur.

Next, base station 100 maps control information onto the E-PDCCH. In the E-PDCCH as well, because the eCCE regions where blind decoding is performed differ for each terminal 200, an attempt is made to map control information onto a decodable region for each terminal 200. Blind decoding in the E-PDCCH is done in the same manner as blind decoding in the PDCCH.

When this is done, in mapping onto E-PDCCH terminals 200, if base station 100 uses the parameter $N_e'$ in Equation 2, verification is made whether or not there is collision with the A/N resource of PDCCH terminal 200. If collision does not occur, this mapping is used, and an instruction is given to terminal 200 by AI to use an A/N resource based on Equation 2 and "$N_e'$". If there will be A/N signal collision, an instruction is given by AI so that an A/N resource based on Equation 2 and "$N_e$" is used.

Let us consider a case where PDCCH control information is transmitted to terminal 200 positioned at a macrocell edge (noted as "macro terminal" in FIG. 18) and terminal 200 positioned in proximity to the receiving station (noted as "pico terminal" in FIG. 18). In this case, as shown in FIG. 18 and FIG. 19, of D-A/N resources R1a and R1b corresponding to control information, the resource R1a within the normal D-A/N region D0 is allocated to the macro terminal 200. Also, of the D-A/N resource R2a and R2b corresponding to the control information, the resource R2b within the D-A/N region D1 for the terminal in proximity to the receiving station is allocated to the pico terminal 200. When this is done, as shown in FIG. 18, the control information of macro terminal 200 and the control information of pico terminal 200 are mapped onto different CCEs of the PDCCH. Thus, if only PDCCH terminals 200 exist, and if a D-A/N resource is allocated to one region of the two D-A/N regions D0 and D1, the D-A/N resource of the corresponding other region will always be available. For example, in the example shown in FIG. 19, D-A/N resources R1b and R2a will always be available.

Therefore, by allocating the A/N resource of an E-PDCCH terminal 200 by the AI of step (3), the D-A/N resource of the E-PDCCH terminal 200 will be placed in the available resources D-A/N regions D0 and D1 for the PDCCH terminal. Thus, there is no collision between the D-A/N resource of E-PDCCH terminal 200 and the D-A/N resource of PDCCH terminal 200.

Step (4): When the control information mapping is completed for all terminals 200, base station 100 transmits the signal on the downlink.

Step (5): Terminal 200 obtains control information intended for terminal 200 from the received signal and extracts and decodes the data signal. Simultaneously, the code and frequency resources for transmitting the control information and the A/N signal of the received data are identified based on the control information. In particular, from the AI included in the control information, E-PDCCH terminal 200 determines which A/N resource is to be used between that when the $N_e$ value is substituted and that when the $N_e'$ value is substituted as the resource offset parameter in Equation 2.

Step (6): Terminal 200, in accordance with the data signal judgment result, identifies ACK or NACK, and transmits the A/N signal using the A/N resources (code and frequency resources) identified as noted above.

[Effect]

As noted above, in a communication system of Embodiment 2, a resource offset parameter that determines the D-A/N resource of the E-PDCCH terminal 200 based on an instruction by AI is switched between $N_e$ and $N_e'$. This switching enables the placement of the A/N signal of E-PDCCH terminal 200 in the D-A/N regions D2 or D3, without collision between the A/N signal of E-PDCCH terminal 200 and the A/N signal of PDCCH terminal 200. In this case, because the D-A/N regions D0 and D1 for the PDCCH terminal and the D-A/N regions D2 and D3 for the E-PDCCH terminal are set so as to overlap, there is no unnecessary reduction of the PUSCH band (refer to FIG. 20).

Also, because in the communication system of Embodiment 2 an A/N resource that is available in the D-A/N region for PDCCH terminal 200 is filled by the AI selection, a high A/N resource utilization efficiency can be achieved.

In a communication system of Embodiment 2, although the A/N resources indicated by RRC, which were required in Embodiment 1, are not required, the possibility of A/N signal collision between PDCCH terminal 200 and E-PDCCH terminal 200 can be made zero. Additionally, in this communication system, it is possible to reserve wide PUSCH frequency resources to the extent that there are no A/N resources indicated by RRC. In this communication system, because there are no A/N resources indicated by RRC, the frequency of occurrence of RRC Reconfig can be further reduced.

(Variation 1)

The communication system of Embodiment 2 can achieve the same effect even if the following change is made thereto.

For example, the parameters switched by AI may include not only the value to be substituted into the parameter $N_e$ of Equation 2, but may also include a parameter that establishes the ZAC sequence or the cyclic shift hopping pattern (in this case, this being called "virtual ID (VCID))," similar to the cell ID. That is, base station 100 may notify a plurality of terminals 200 of $\{N_e', VCID\}$ as a parameter set beforehand, with AI being used as a bit for selecting the parameter set $\{N_e, \text{cell ID}\}$ or the parameter set $\{N_e', VCID\}$.

This configuration is provided to support the following background. That is, in Rel. 11a study is being done of making a parameter that is common to the cells for determining the PUCCH ZAC sequence and cyclic shift hopping pattern (cell ID) to be a parameter that is given for each terminal individually (virtual cell ID). Also, a study is being done of giving for each terminal individually the cell-specific parameter $\Delta_{shift}^{PUCCH}$ that determines the utilization density of A/N resources in the D-A/N region. The parameter $\Delta_{shift}^{PUCCH}$, for example, gives an instruction of the spacing of the cyclic shift values between two adjacent A/N resources, which can be switched in size, depending upon the communication quality. In the case in which the above-noted parameters used by PDCCH terminal 200 differ for each D-A/N region, unless the ZAC sequence, the cyclic shift hopping pattern, and the like of E-PDCCH terminal 200 are also adjusted thereto, the PUCCH cannot be orthogonally multiplexed.

Given this, in the communication system of Variation 1, notification is given of parameters determining the ZAC sequence, the cyclic shift hopping pattern and the like as a set beforehand, and these parameter sets are switched according to AI. This enables making the PUCCH of E-PDCCH terminal 200 always be orthogonal with that of PDCCH terminal 200 in the D-A/N region both before and after switching.

(Variation 2)

In the communication system of Embodiment 2, a transmitting power offset may be included in the parameter set switched according to AI.

In COMP scenario 4, because the transmitting power suitable for each D-A/N region differs, there is a risk that the A/N signal of E-PDCCH terminal 200 will interfere with the A/N signal of PDCCH terminal 200 without any countermeasure. Given this, according to the communication system of Embodiment 2, including in the parameter set an offset amount such as to obtain an appropriate transmitting power makes it possible to avoid such interference.

In CoMP scenario 4, even between a plurality of pico cells to which different virtual cell IDs applied, or between adjacent macro cells having different cell IDs, there is a risk of interference between the A/N signal of E-PDCCH terminal 200 and the A/N signal of PDCCH terminal 200. According to the communication system of Variation 2, however, by offsetting the transmitting power, because an excessive transmitting power is not set for the E-PDCCH terminal, the interference with other cells can be reduced.

Although the description has been for an example in which the transmitting power offset is included in the parameter set, the parameter included may be any parameter changing the transmitting power of terminal 200, such as a reference signal for path loss estimation, an accumulated value of transmitting power control commands (TPCs), or a power control parameter.

(Other Variations)

In Embodiment 2, a description has been given of the examples using the resource offsets N, N', and $N_e$ of Equations 1, 2, and 5 as the parameters specifying the plurality of D-A/N regions D0 to D3. However, the specification of the plurality of D-A/N regions D0 to D3 may be made by other parameters such as a parameter directly indicating a frequency resource block.

The range of the frequency resource block numbers is small compared to the A/N resource number. Thus, this variation reduces the signaling overhead.

A communication system that dynamically selects the method of allocating A/N resources of Embodiment 1 and the method of allocating A/N resources of Embodiment 2 may be adopted. For example, in the case in which there is notification beforehand of a parameter that gives an instruction for a plurality of D-A/N regions, E-PDCCH terminal 200 operation is done as in Embodiment 2, and in the case in which there is no instruction of a plurality of D-A/N regions but rather of a parameter that instructs regarding a specific A/N resource beforehand, operation is done as in Embodiment 1.

According to this communication system, RRC notification A/N resources can be reserved as necessary, even in the case of CAMP scenario 4.

Also, in Variation 1 of Embodiment 2, the configuration is employed in which notification of one parameter set $\{N_e', VCID\}$ is made beforehand to terminal 200, and AI switches between the cell-specific parameter set $\{N_e, \text{cell ID}\}$ and the parameter set $\{N_e', VCID\}$ of which notification was made. However, the configuration may be employed in which notification is made to terminal 200 of a plurality of parameter sets with AI used to switch between the parameters.

Such a configuration enables an increase of the degree of freedom of the configuration of PUCCH on which the A/N signal is transmitted.

<Overview of Aspects of the Invention>

Next, an aspect of the present invention will be described.

A first aspect of the present invention provides a radio communication terminal including: a receiving section that receives, via an enhanced physical downlink control channel, a control signal including an ACK/NACK indicator; a control section that determines, based on the ACK/NACK indicator, whether to transmit an ACK/NACK signal for downlink data using a dynamic ACK/NACK resource dynamically allocated or using a specific resource specified beforehand; and a transmitting section that transmits the ACK/NACK signal using the determined dynamic ACK/NACK resource or specific resource.

According to the first aspect, the method of allocating an A/N resource for an E-PDCCH terminal can be switched by an ACK/NACK indicator. This switching enables allocation without a reduction of the PUSCH band in a situation where collision between A/N signals of a PDCCH terminal and an E-PDCCH terminal can be avoided. In addition, when collision cannot be avoided using the allocation method, allocation that avoids collision between A/N signals can be performed by reducing the PUSCH band. Thus, it is possible to make a contribution to avoiding collision between A/N signals and the improvement of the A/N resource utilization efficiency.

A second aspect of the present invention provides the radio communication terminal according to the first aspect in which: the enhanced physical downlink control channel is a channel that is frequency-multiplexed with a physical downlink data channel; the control signal is transmitted by any one control channel element of a plurality of control channel elements that are a plurality of elements divided from the enhanced physical downlink control channel; the control section determines, as the dynamic ACK/NACK resource, a resource associated with a number of the control channel element to which a control signal of the radio communication terminal is assigned, from among a plurality of resources included in a dynamic ACK/NACK region provided in an uplink channel; and the ACK/NACK indicator is information for switching a resource used for transmitting the ACK/NACK signal.

According to the second aspect, a dynamic ACK/NACK resource for an E-PDCCH terminal can be determined by the same processing as the processing for allocating a D-A/N resource for a PDCCH terminal.

A third aspect of the present invention provides the radio communication terminal according to the second aspect in which: the dynamic ACK/NACK region is set so as to overlap with a resource region to which a resource used for transmitting the ACK/NACK signal is dynamically allocated in accordance with a control signal received via a physical downlink control channel that is time-multiplexed with a physical downlink data channel.

According to the third aspect, it is possible to surely suppress a reduction of the PUSCH band when a dynamic ACK/NACK resource is selected.

A fourth aspect of the present invention provides the radio communication terminal according to the first aspect, in which the specific resource is specified by notification of radio resource control.

According to the fourth aspect, selecting a specific resource makes it possible to surely avoid collision between A/N signals of a PDCCH terminal and an E-PDCCH terminal.

A fifth aspect of the present invention provides the radio communication terminal according to the second aspect, in which the plurality of resources included in the dynamic ACK/NACK region include both or one of a frequency resource and a code resource.

According to the fifth aspect, a large number of dynamic A/N resources for E-PDCCH terminals can be secured as in the case of D-A/N resources for PDCCH terminals.

A sixth aspect of the present invention provides a radio communication terminal including: a receiving section that receives, via an enhanced physical downlink control channel, a control signal including an ACK/NACK indicator; a control section that selects, based on the ACK/NACK indicator, one of a plurality of dynamic ACK/NACK regions separated from each other in the frequency domain, and that determines, from among a plurality of resources included in the selected dynamic ACK/NACK region, a dynamic ACK/NACK resource used for transmitting an ACK/NACK signal for downlink data, in accordance with the control signal; and a transmitting section that transmits the ACK/NACK signal using the determined dynamic ACK/NACK resource in the selected dynamic ACK/NACK resource region.

According to the six aspect, it is possible to improve the A/N resource utilization efficiency while avoiding collision between A/N signals of a PDCCH terminal and an E-PDCCH terminal in a system in which a plurality of D-A/N regions are set for PDCCH terminals, and the A/N resources are used sparsely in these regions.

A seventh aspect of the present invention provides the radio communication terminal according to the six aspect, in which: the plurality of dynamic ACK/NACK regions are set so as to overlap respectively with a plurality of resource regions to which a resource used for transmitting the ACK/NACK signal is dynamically allocated in accordance with a control signal received via a physical downlink control channel that is time-multiplexed with a physical downlink data channel; and the plurality of resource regions are separated from each other in the frequency domain, one of the resource regions is selected in accordance with a size of transmission power for an ACK/NACK signal, and the resource according to the control signal of the physical downlink control channel is allocated in the selected one of the resource regions.

According to the seventh aspect, an A/N resource not used in a resource region for a PDCCH terminal can be allocated for an E-PDCCH terminal. Thus, it is possible to surely improve the A/N resource utilization efficiency.

An eighth aspect of the present invention provides the radio communication terminal according to the six aspect, in which: the enhanced physical downlink control channel is a channel that is frequency-multiplexed with a physical downlink data channel; the control signal is transmitted by any one control channel element of a plurality of control channel elements that are a plurality of elements divided from the enhanced physical downlink control channel; and the control section determines, as the dynamic ACK/NACK resource used for transmitting the ACK/NACK signal, a resource associated with a number of the control channel element to which the control signal of the radio communication terminal is assigned, from among a plurality of resources included in the selected dynamic ACK/NACK region.

According to the eighth aspect, a dynamic ACK/NACK resource for an E-PDCCH terminal can be determined by the same processing as the processing for allocating a D-A/N resource for a PDCCH terminal.

A ninth aspect of the present invention provides the radio communication terminal according to the six aspect, in which: the control section switches a signal-generating-parameter based on the ACK/NACK indicator and generates the ACK/NACK signal based on the switched signal-generating-parameter.

According to the ninth aspect, when a signal generation parameter for ACK/NACK signals in a PDCCH terminal is switched between a plurality of resource regions, a signal generation parameter for ACK/NACK signals in an E-PDCCH terminal can be switched according to the signal generation parameter for ACK/NACK signals in a PDCCH terminal. Accordingly, interference between ACK/NACK signals for PDCCH terminals and ACK/NACK signals for E-PDCCH terminals can be reduced.

A tenth aspect of the present invention provides the radio communication terminal according to the ninth aspect, in which: the signal-generating-parameter includes one or a plurality of a basic sequence used for spreading the ACK/NACK signal, a shift pattern of the basic sequence with a cyclic shift value, and a placement density of a transmitting resource for the ACK/NACK signal.

According to the tenth aspect, it is possible to support switching of a basic sequence such as a ZAC sequence, a CS hopping pattern, and a parameter $\Delta_{shift}^{PUCCH}$, for example.

An eleventh aspect of the present invention provides the radio communication terminal according to the sixth aspect, in which the control section switches, based on the ACK/NACK indicator, a transmission-power-parameter and determines transmission power for the ACK/NACK signal based on the switched transmission-power-parameter.

According to the eleventh aspect, when the transmission power for an ACK/NACK signal of a PDCCH terminal is switched between a plurality of resource regions, the transmission power for an ACK/NACK signal of an E-PDCCH terminal can be switched according to the transmission power for an ACK/NACK signal of a PDCCH terminal. Accordingly, interference between ACK/NACK signals for a PDCCH terminal and ACK/NACK signals for an E-PDCCH terminal can be reduced.

A twelfth aspect of the present invention provides the radio communication terminal according to the eleventh aspect, in which the transmission-power-parameter includes one or a plurality of a transmitting power offset, a reference signal for path loss estimation, an accumulated value of a transmission power control command (TPC), and a power control parameter.

According to the twelfth aspect, the transmission power for ACK/NACK signals of an E-PDCCH terminal can be switched using an appropriate parameter.

A thirteenth aspect of the present invention provides a base station apparatus including: a control section that determines whether a resource used for transmitting an ACK/NACK signal for downlink data from a radio communication terminal is to be a dynamic ACK/NACK resource to be dynamically allocated in accordance with a downlink control signal or to be a specific resource specified beforehand; and a transmitting section that transmits, using an enhanced physical downlink control channel, a control signal including an ACK/NACK indicator representing the result of determination made by the control section.

According to the thirteenth aspect, the method of allocating an A/N resource for an E-PDCCH terminal can be switched by an ACK/NACK indicator. This switching makes possible a contribution to avoiding collision between A/N signals and the improvement of the A/N resource utilization efficiency.

A fourteenth aspect of the present invention provides a base station apparatus including: a control section that determines to which of a plurality of dynamic ACK/NACK regions separated from each other in the frequency domain, a resource used for transmitting an ACK/NACK signal for downlink data from a radio communication terminal is to be allocated; and a transmitting section that transmits a control signal including an ACK/NACK indicator representing the results of determination made by the control section, using a control channel element associated with the resource used for transmitting the ACK/NACK signal on an enhanced physical downlink control channel.

According to the fourteenth aspect, it is possible to improve the A/N resource utilization efficiency while avoiding collision between A/N signals of a PDCCH terminal and an E-PDCCH terminal in a system in which a plurality of D-A/N regions are set for PDCCH terminals, and the A/N resources are used sparsely in these regions.

A fifteenth aspect of the present invention provides a resource allocation method including: receiving a control signal including an ACK/NACK indicator via an enhanced physical downlink control channel; and determining, based on the ACK/NACK indicator, whether an ACK/NACK signal for downlink data is to be transmitted using a dynamic ACK/NACK resource dynamically allocated or is to be transmitted using a specific resource specified beforehand.

According to the fifteenth aspect, the method of allocating an A/N resource for an E-PDCCH terminal can be switched by an ACK/NACK indicator. This switching makes possible a contribution to avoiding collision between A/N signals and the improvement of the A/N resource utilization efficiency.

A sixteenth aspect of the present invention provides a resource allocation method including: receiving a control signal including an ACK/NACK indicator via an enhanced physical downlink control channel; and selecting, based on the ACK/NACK indicator, one of a plurality of dynamic ACK/NACK regions separated from each other in the frequency domain, and determining from among a plurality of resources included in the selected dynamic ACK/NACK region, a dynamic ACK/NACK resource used for transmitting an ACK/NACK signal for downlink data, in accordance with the control signal.

According to the sixteenth aspect, it is possible to improve the A/N resource utilization efficiency while avoiding collision between A/N signals of a PDCCH terminal and an E-PDCCH terminal in a system in which a plurality of D-A/N regions are set for PDCCH terminals, and the A/N resources are used sparsely in these regions.

The embodiments of the present invention have been described thus far.

In the embodiments described above, the present invention is described using an example of a case where the present invention is implemented as hardware. However, the present invention can be achieved by software in concert with hardware.

The functional blocks described in the embodiments described above are achieved by an LSI, which is typically an integrated circuit. The functional blocks may be provided as individual chips, or part or all of the functional blocks may be provided as a single chip. Depending on the level of integration, the LSI may be referred to as an IC, a system LSI, a super LSI, or an ultra LSI.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

The disclosure of Japanese Patent Application No. 2012-108447, filed on May 10, 2012, including the specification, drawings and abstract, are incorporated herein by reference in its entirety.

INDUSTRIAL APPLICABILITY

The present invention can be applied to a radio communication terminal, a base station apparatus, a resource allocation method, and the like of a mobile communication system.

REFERENCE SIGNS LIST

11 Antenna
12 Control information generation section
13 Control information coding section
14, 17 Modulation section
15 Data coding section
16 Retransmission control section
18 Subframe configuration section
19 IFFT section
20 CP appending section
21 Radio transmitting section
22 Radio receiving section 23 CP removal section
24 Despreading section
25 Correlation processing section
26 Judgment section
41 Antenna
42 Radio receiving section
43 CP removal section
44 FFT section
45 Extraction section
46 Data demodulation section
47 Data decoding section
48 Judgment section
49 Control information demodulation section
50 Control information decoding section
51 Control information judgment section
52 Control processing section
53 A/N signal modulation section
54 Primary spreading section
55, 60 IFFT section
56 CP appending section
57 Secondary spreading section
58 Multiplexing section
59 Radio transmitting section
61 CP appending section
62 Spreading section
100 Base station
110 Control section
120 Transmitting section
200 Terminal
210 Transmitting section
220 Control section
230 Receiving section
D0 to D3 D-A/N region
R1a, R2a, R1b, R2b D-A/N resource

The invention claimed is:

1. A radio communication terminal comprising:
a receiver, which, in operation, receives, via an enhanced physical downlink control channel (E-PDCCH), a control signal including an ACK/NACK indicator, wherein the ACK/NACK indicator takes one of four possible values including a first value and a second value; and
a controller, which, in operation, determines, based on the ACK/NACK indicator and an enhanced control channel element (eCCE) number of the received E-PDCCH, a resource number to transmit an ACK/NACK signal for downlink data using a dynamic ACK/NACK resource dynamically allocated in accordance with the control signal,
wherein the controller, in operation, determines a first resource number as the resource number when the ACK/NACK indicator takes the first value and determines a second resource number as the resource number when the ACK/NACK indicator takes the second value, wherein a value of the difference between the first resource number and the second resource number is 1; and
a transmitter, which, in operation, transmits the ACK/NACK signal using the dynamic ACK/NACK resource having the determined resource number when the ACK/NACK indicator takes the first value or the second value.

2. The radio communication terminal according to claim 1, wherein the controller, in operation, determines, based on the ACK/NACK indicator, whether to transmit the ACK/NACK signal using the dynamic ACK/NACK resource or using a specific resource specified beforehand, and
the transmitter, in operation, transmits the ACK/NACK signal using the specific resource when the ACK/NACK indicator indicates to use the specific resource.

3. The radio communication terminal according to claim 2, wherein:
the E-PDCCH is a channel that is frequency-multiplexed with a physical downlink data channel;
the control signal is transmitted by any one eCCE of a plurality of eCCEs constituting the E-PDCCH;
the controller, in operation, determines, as the dynamic ACK/NACK resource, a resource associated with an eCCE number of the eCCE to which a control signal of the radio communication terminal is assigned, from among a plurality of resources included in a dynamic ACK/NACK region provided in an uplink channel; and
the ACK/NACK indicator is information for switching a resource used for transmitting the ACK/NACK signal.

4. The radio communication terminal according to claim 3, wherein the dynamic ACK/NACK region is set so as to overlap with a resource region to which a resource used for transmitting the ACK/NACK signal is dynamically allocated in accordance with a control signal received via a physical downlink control channel that is time-multiplexed with a physical downlink data channel.

5. The radio communication terminal according to claim 2, wherein the specific resource is specified by notification of radio resource control information.

6. The radio communication terminal according to claim 3, wherein the plurality of resources included in the dynamic ACK/NACK region includes both or one of a frequency resource and a code resource.

7. A resource allocation method comprising:
receiving a control signal including an ACK/NACK indicator via an enhanced physical downlink control channel (E-PDCCH), wherein the ACK/NACK indicator takes one of four possible values including a first value and a second value;
determining, based on the ACK/NACK indicator and an enhanced control channel element (eCCE) number of the received E-PDCCH, a resource number to transmit an ACK/NACK signal for downlink data using a dynamic ACK/NACK resource dynamically allocated in accordance with the control signal,
wherein the determining includes determining a first resource number as the resource number when the ACK/NACK indicator takes the first value and determining a second resource number as the resource number when the ACK/NACK indicator takes the second value, wherein a value of the difference between the first resource number and the second resource number is 1; and
transmitting the ACK/NACK signal using the dynamic ACK/NACK resource having the determined resource number when the ACK/NACK indicator takes the first value or the second value.

8. The resource allocation method according to claim 7, wherein:
the determining includes determining, based on the ACK/NACK indicator, whether to transmit the ACK/NACK signal using the dynamic ACK/NACK resource or using a specific resource specified beforehand, and
the transmitting includes transmitting the ACK/NACK signal using the specific resource when the ACK/NACK indicator indicates to use the specific resource.

9. The resource allocation method according to claim 8, wherein:

the E-PDCCH is a channel that is frequency-multiplexed with a physical downlink data channel;

the control signal is transmitted by any one eCCE of a plurality of eCCEs constituting the E-PDCCH;

the determining includes determining, as the dynamic ACK/NACK resource, a resource associated with an eCCE number of the eCCE to which a control signal of the radio communication terminal is assigned, from among a plurality of resources included in a dynamic ACK/NACK region provided in an uplink channel; and the ACK/NACK indicator is information for switching a resource used for transmitting the ACK/NACK signal.

10. The resource allocation method according to claim 9, wherein the dynamic ACK/NACK region is set so as to overlap with a resource region to which a resource used for transmitting the ACK/NACK signal is dynamically allocated in accordance with a control signal received via a physical downlink control channel that is time-multiplexed with a physical downlink data channel.

11. The resource allocation method according to claim 8, wherein the specific resource is specified by notification of radio resource control information.

12. The resource allocation method according to claim 9, wherein the plurality of resources included in the dynamic ACK/NACK region includes both or one of a frequency resource and a code resource.

* * * * *